MULTIPLYING AND DIVIDING MEANS FOR ELECTRONIC CALCULATORS

Filed July 12, 1952 10 Sheets-Sheet 1

INVENTOR
WILLIAM H. BURKHART
BY William S. Glover
AGENT

MULTIPLYING AND DIVIDING MEANS FOR ELECTRONIC CALCULATORS

Filed July 12, 1952 10 Sheets-Sheet 2

INVENTOR
WILLIAM H. BURKHART
BY William L. Glover
AGENT

May 13, 1958 W. H. BURKHART 2,834,543

MULTIPLYING AND DIVIDING MEANS FOR ELECTRONIC CALCULATORS

Filed July 12, 1952 10 Sheets-Sheet 3

INVENTOR
WILLIAM H. BURKHART
BY William L. Glover
AGENT

May 13, 1958 W. H. BURKHART 2,834,543

MULTIPLYING AND DIVIDING MEANS FOR ELECTRONIC CALCULATORS

Filed July 12, 1952 10 Sheets-Sheet 4

INVENTOR
WILLIAM H. BURKHART

BY William L. Glover

AGENT

MULTIPLYING AND DIVIDING MEANS FOR ELECTRONIC CALCULATORS

Filed July 12, 1952

INVENTOR
WILLIAM H. BURKHART
BY William S. Glover
AGENT

May 13, 1958 W. H. BURKHART 2,834,543

MULTIPLYING AND DIVIDING MEANS FOR ELECTRONIC CALCULATORS

Filed July 12, 1952 10 Sheets-Sheet 6

INVENTOR
WILLIAM H. BURKHART
BY William L. Glover
AGENT

MULTIPLYING AND DIVIDING MEANS FOR ELECTRONIC CALCULATORS

Filed July 12, 1952 10 Sheets-Sheet 7

INVENTOR
WILLIAM H. BURKHART
BY William P. Glover
AGENT

INVENTOR
WILLIAM H. BURKHART
BY William L. Glover
AGENT

May 13, 1958 W. H. BURKHART 2,834,543

MULTIPLYING AND DIVIDING MEANS FOR ELECTRONIC CALCULATORS

Filed July 12, 1952 10 Sheets-Sheet 9

INVENTOR
WILLIAM H. BURKHART
BY William L. Glover
AGENT

| | | $t_{85}$ | $t_{81}$ … | $t_{45}$ … | $t_1$ … $t_{145}$ | | |
|---|---|---|---|---|---|---|---|
| 1st COMPARISON | ∼15 | | | 0 0 0 0 0 6 8 2 4 6.2 | 2 4 8 6 0 8 0 0 0 | DIVIDEND | COMPARE |
| QUOTIENT DIGIT—0 | | 0 | 0 0 0 0 0 0 2 2 4 4 | 6.8 6 4 2 8 0 0 0 0 0 | | $m_1$ | |
| 2nd COMPARISON | ∼16 | | 0 | 0 0 0 0 6 8 2 4 6.2 2 | 4 8 6 0 8 0 0 0 | 1st REMAINDER | SUBTRACT ZERO, SHIFT, COMPARE |
| QUOTIENT DIGIT—0 | | 0 | 0 0 0 0 0 0 2 2 4 4 | 6.8 6 4 2 8 0 0 0 0 0 | | $m_1$ | |
| 3RD COMPARISON | ∼17 | | 0 0 | 0 0 0 6 8 2 4 6.2 2 4 | 8 6 0 8 0 0 0 | 2nd REMAINDER | SUBTRACT ZERO, SHIFT, COMPARE |
| QUOTIENT DIGIT—0 | | 0 | 0 0 0 0 0 0 2 2 4 4 | 6.8 6 4 2 8 0 0 0 0 0 | | $m_1$ | |
| 4TH COMPARISON | ∼18 | | 0 0 0 | 0 0 6 8 2 4 6.2 2 4 8 | 6 0 8 0 0 0 | 3RD REMAINDER | SUBTRACT ZERO, SHIFT, COMPARE |
| QUOTIENT DIGIT—0 | | 0 | 0 0 0 0 0 0 2 2 4 4 | 6.8 6 4 2 8 0 0 0 0 0 | | $m_1$ | |
| 5TH COMPARISON | ∼19 | | 0 0 0 0 | 0 6 8 2 4 6.2 2 4 8 6 | 0 8 0 0 0 | 4TH REMAINDER | SUBTRACT ZERO, SHIFT, COMPARE |
| QUOTIENT DIGIT—0 | | 0 | 0 0 0 0 0 0 2 2 4 4 | 6.8 6 4 2 8 0 0 0 0 0 | | $m_1$ | |
| 6TH COMPARISON | ∼20 | | 0 0 0 0 0 | 6 8 2 4 6.2 2 4 8 6 0 | 8 0 0 0 | 5TH REMAINDER | SUBTRACT ZERO, SHIFT, COMPARE |
| QUOTIENT DIGIT—0 | | 0 | 0 0 0 0 0 0 2 2 4 4 | 6.8 6 4 2 8 0 0 0 0 0 | | $m_1$ | |
| 7TH COMPARISON | ∼21 | | 0 0 0 0 0 6 | 8 2 4 6.2 2 4 8 6 0 8 | 0 0 0 | 6TH REMAINDER | SUBTRACT ZERO, SHIFT, COMPARE |
| QUOTIENT DIGIT—0 | | 0 | 0 0 0 0 0 0 2 2 4 4 | 6.8 6 4 2 8 0 0 0 0 0 | | $m_1$ | |
| 8TH COMPARISON | ∼22 | | 0 0 0 0 0 6 8 | 2 4 6.2 2 4 8 6 0 8 0 | 0 0 | 7TH REMAINDER | SUBTRACT ZERO, SHIFT, COMPARE |
| QUOTIENT DIGIT—0 | | 0 | 0 0 0 0 0 0 2 2 4 4 | 6.8 6 4 2 8 0 0 0 0 0 | | $m_1$ | |
| 9TH COMPARISON | ∼23 | | 0 0 0 0 0 6 8 2 | 4 6.2 2 4 8 6 0 8 0 0 | 0 | 8TH REMAINDER | SUBTRACT ZERO, SHIFT, COMPARE |
| QUOTIENT DIGIT—0 | | 0 | 0 0 0 0 0 0 2 2 4 4 | 6.8 6 4 2 8 0 0 0 0 0 | | $m_1$ | |
| 10TH COMPARISON | ∼24 | | 0 0 0 0 0 6 8 2 4 | 6.2 2 4 8 6 0 8 0 0 0 | | 9TH REMAINDER | SUBTRACT ZERO, SHIFT, COMPARE |
| QUOTIENT DIGIT—3 | | 0 | 0 0 0 0 0 6 7 3 4 | 0.5 9 2 8 4 0 0 0 0 0 | | $m_3$ | |
| 11TH COMPARISON | ∼25 | 0 | 0 0 0 0 0 0 0 9 0 5 | .6 3 2 0 2 0 8 0 0 0 0 | | 10TH REMAINDER | SUBTRACT $m_3$, SHIFT, COMPARE |
| QUOTIENT DIGIT—0 | | 0 | 0 0 0 0 0 0 2 2 4 4 | 6.8 6 4 2 8 0 0 0 0 0 | | $m_1$ | |
| 12TH COMPARISON | ∼26 | 0 | 0 0 0 0 0 0 9 0 5.6 | 3 2 0 2 0 8 0 0 0 0 0 | | 11TH REMAINDER | SUBTRACT ZERO, SHIFT, COMPARE |
| QUOTIENT DIGIT—4 | | 0 | 0 0 0 0 0 0 8 9 7 8 | 7.4 5 7 1 2 0 0 0 0 0 | | $m_4$ | |
| 13TH COMPARISON | ∼27 | 0 | 0 0 0 0 0 0 7.7 5 | 7 4 4 9 6 0 0 0 0 0 0 | | 12TH REMAINDER | SUBTRACT $m_4$, SHIFT, COMPARE |
| QUOTIENT DIGIT—0 | | 0 | 0 0 0 0 0 2 2 4 4 | 6.8 6 4 2 8 0 0 0 0 0 | | $m_1$ | |
| 14TH COMPARISON | ∼28 | 0 | 0 0 0 0 0 7.7 5 7 | 4 4 9 6 0 0 0 0 0 0 0 | | 13TH REMAINDER | SUBTRACT ZERO, SHIFT, COMPARE |
| QUOTIENT DIGIT—3 | | 0 | 0 0 0 0 0 6 7 3 4 | 0.5 9 2 8 4 0 0 0 0 0 | | $m_3$ | |
| 15TH COMPARISON | ∼29 | 0 | 0 0 0 0 1.0 2 3 3 | 9 0 3 1 6 0 0 0 0 0 0 | | 14TH REMAINDER | SUBTRACT $m_3$, SHIFT, COMPARE |
| QUOTIENT DIGIT—4 | | 0 | 0 0 0 0 0 8 9 7 8 | 7.4 5 7 1 2 0 0 0 0 0 | | $m_4$ | |
| 16TH COMPARISON | ∼30 | 0 | 0 0 0 0.1 2 5 5 1 | 5 7 4 4 8 0 0 0 0 0 0 | | 15TH REMAINDER | SUBTRACT $m_4$, SHIFT, COMPARE |
| QUOTIENT DIGIT—5 | | 0 | 0 0 0 0 1 1 2 2 3 | 4.3 2 1 4 0 0 0 0 0 0 | | $m_5$ | |
| 17TH COMPARISON | ∼31 | 0 | 0 0 0.0 1 3 2 8 1 | 4 2 3 4 0 0 0 0 0 0 0 | | 16TH REMAINDER | SUBTRACT $m_5$, SHIFT, COMPARE |
| QUOTIENT DIGIT—5 | | 0 | 0 0 0 0 1 1 2 2 3 | 4.3 2 1 4 0 0 0 0 0 0 | | $m_5$ | |
| 18TH COMPARISON | ∼32 | 0 | 0 0.0 0 2 0 5 7 9 | 9 1 2 6 0 0 0 0 0 0 0 | | 17TH REMAINDER | SUBTRACT $m_5$, SHIFT COMPARE |
| QUOTIENT DIGIT—9 | | 0 | 0 0 0 0 2 0 2 0 2 | 1.7 7 8 5 2 0 0 0 0 0 | | $m_9$ | |
| 19TH COMPARISON | ∼33 | 0 | 0.0 0 0 0 3 7 7 7 | 3 4 7 4 8 0 0 0 0 0 0 | | 18TH REMAINDER | SUBTRACT $m_9$, SHIFT, COMPARE |
| QUOTIENT DIGIT—1 | | 0 | 0 0 0 0 0 2 2 4 4 | 6.8 6 4 2 8 0 0 0 0 0 | | $m_1$ | |
| 20TH COMPARISON | ∼34 | 0. | 0 0 0 0 1 5 3 2 6 | 6 1 0 5 2 0 0 0 0 0 0 | | 19TH REMAINDER | SUBTRACT $m_1$, SHIFT, COMPARE |
| QUOTIENT DIGIT—6 | | 0 | 0 0 0 0 1 3 4 6 8 | 1.1 8 5 6 8 0 0 0 0 0 | | $m_6$ | |
| 21ST COMPARISON | ∼35 | | | | | 20TH REMAINDER | SUBTRACT $m_6$ |

PROBLEM:

0000068246.2248608000 ÷ 000002244.68642800000 = 00000000030403455916

FIG. 17

INVENTOR
WILLIAM H. BURKHART
BY William [signature]
AGENT

United States Patent Office 2,834,543

Patented May 13, 1958

2,834,543

MULTIPLYING AND DIVIDING MEANS FOR ELECTRONIC CALCULATORS

William H. Burkhart, East Orange, N. J., assignor to Monroe Calculating Machine Company, Orange, N. J., a corporation of Delaware Application July 12, 1952, Serial No. 298,526

36 Claims. (Cl. 235—61)

This invention relates to new and useful improvements in electronic digital computers and more particularly to means for performing multiplication and division in said computers.

Many methods of performing multiplication and division are known. Among them is the so-called "nine multiples comparison" method wherein the first step is to form the nine multiples of the multiplicand or divisor. In multiplication the next step is to select the multiple appropriate to the highest or lowest order multiplier digit, whichever is more convenient. Then, while the multiple appropriate to the next lower (or higher) order multiplier digit is being selected, the first selected multiple is shifted one digit space relative to the position which the second multiple assumes. The two multiples then are added and their sum is shifted one digit space while the third multiple is being selected, etc. When the multiple appropriate to the last (highest or lowest order) multiplier digit has been added to the shifted sum of previous multiples, the resultant sum is the product and the multiplication is completed.

In division the several multiples are compared with the dividend to determine which is the largest multiple divisible into the latter, the said largest one is subtracted from the dividend to form a remainder, the remainder is shifted one space to, in effect, obtain a multiplication by ten, and the remainder is compared with the nine multiples of the divisor, etc.

The principal object of the invention is the provision in an electronic computer of means for performing multiplication and division in accordance with the above recited methods.

Another object of the invention is to construct and arrange the said means in such manner that multiplication and division are performed each in a minimum number of cycles of the computer and in such manner that a maximum number of elements of said means are utilized in both operations.

In one embodiment of the invention the means thereof are applied to a cyclically operable serial computer wherein numbers are represented by electric signal pulses of opposite polarity to represent binary one and binary zero, and include a source of numbers to be used in computations, a precessing storage unit wherein a number is precessed one digit space per cycle, an adder-substracter wherein the nine multiples of a multiplicand or divisor are formed by adding the same to itself and its sum on nine successive cycles, a multichannel storage unit wherein the multiples are stored, means for transmitting a multiplier to the precessing unit, a selector circuit for selecting the channels of the multiples storage unit appropriate to a multiplier digit on each of a plurality of successive cycles, means for applying the multiples in selected channels to the adder-subtracter on successive cycles for addition to one another to form a product, means for shifting the first multiple applied to the adder-subtracter after such application and the sums of it and other multiples one digit space per cycle to align the same for appropriate addition to the next multiple to be transmitted to the adder-subtracter, means for transmitting the product formed in the adder-subtractor to the number source, means for transmitting a dividend from the number source to the adder-subtracter, circuit means for comparing a predetermined portion of the dividend with the nine multiples of the divisor, said comparison means controlling said selection circuit in accordance with the highest multiple divisible into the dividend to effect transmittal of said multiple to the adder-subtracter for subtraction of the same from the dividend, means for shifting the remainder effectively one digit space for comparison with the nine multiples, means for recording in the precessing unit the quotient digits appropriate to the results of the comparison, and means for transmitting an assembled quotient to said number source.

Other objects and features of the invention will become apparent in the following description when read in the light of the drawings of which:

Figure 1:
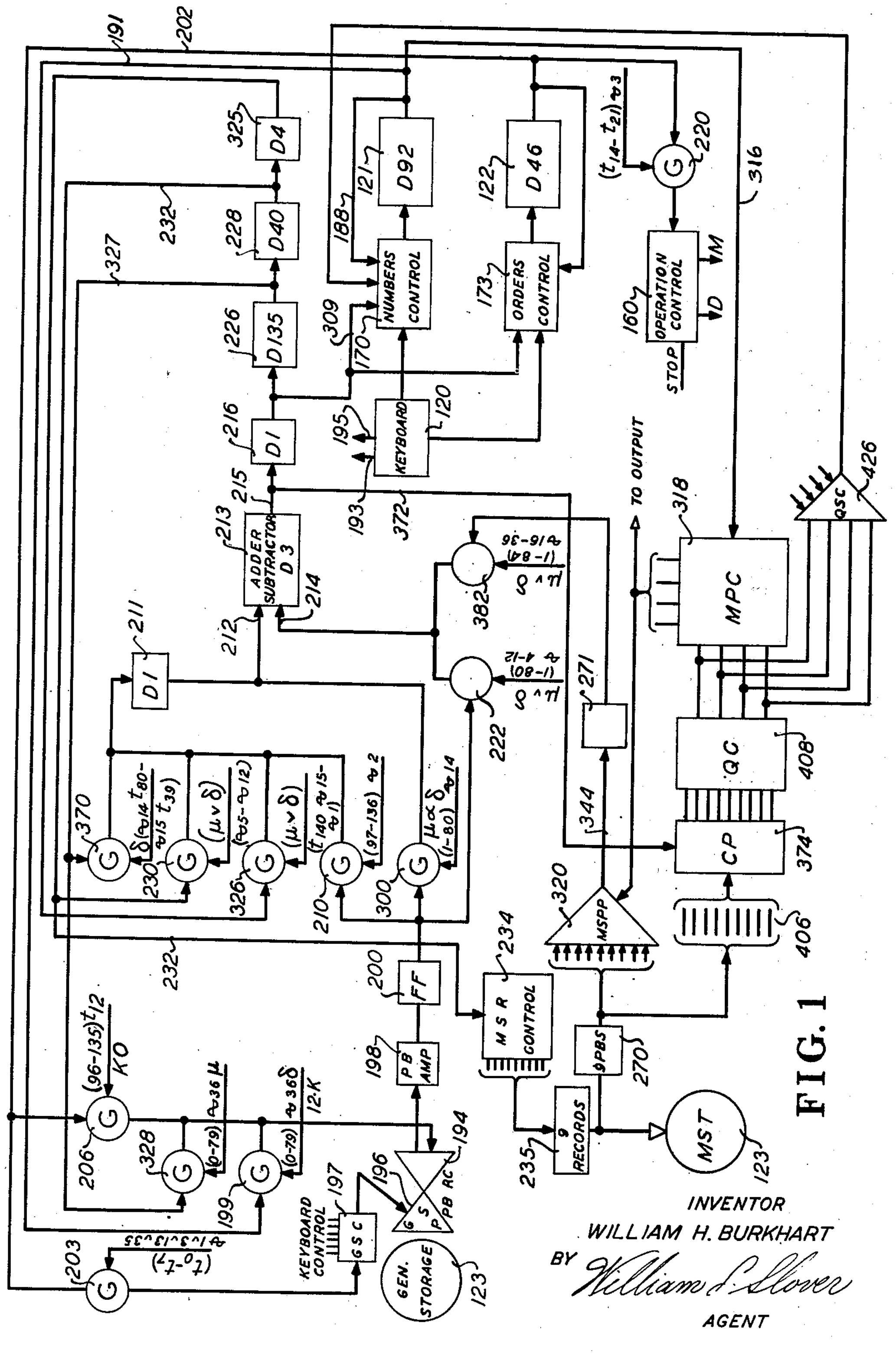
Fig. 1 is a general block diagram of the means of the invention.
Figure 9:
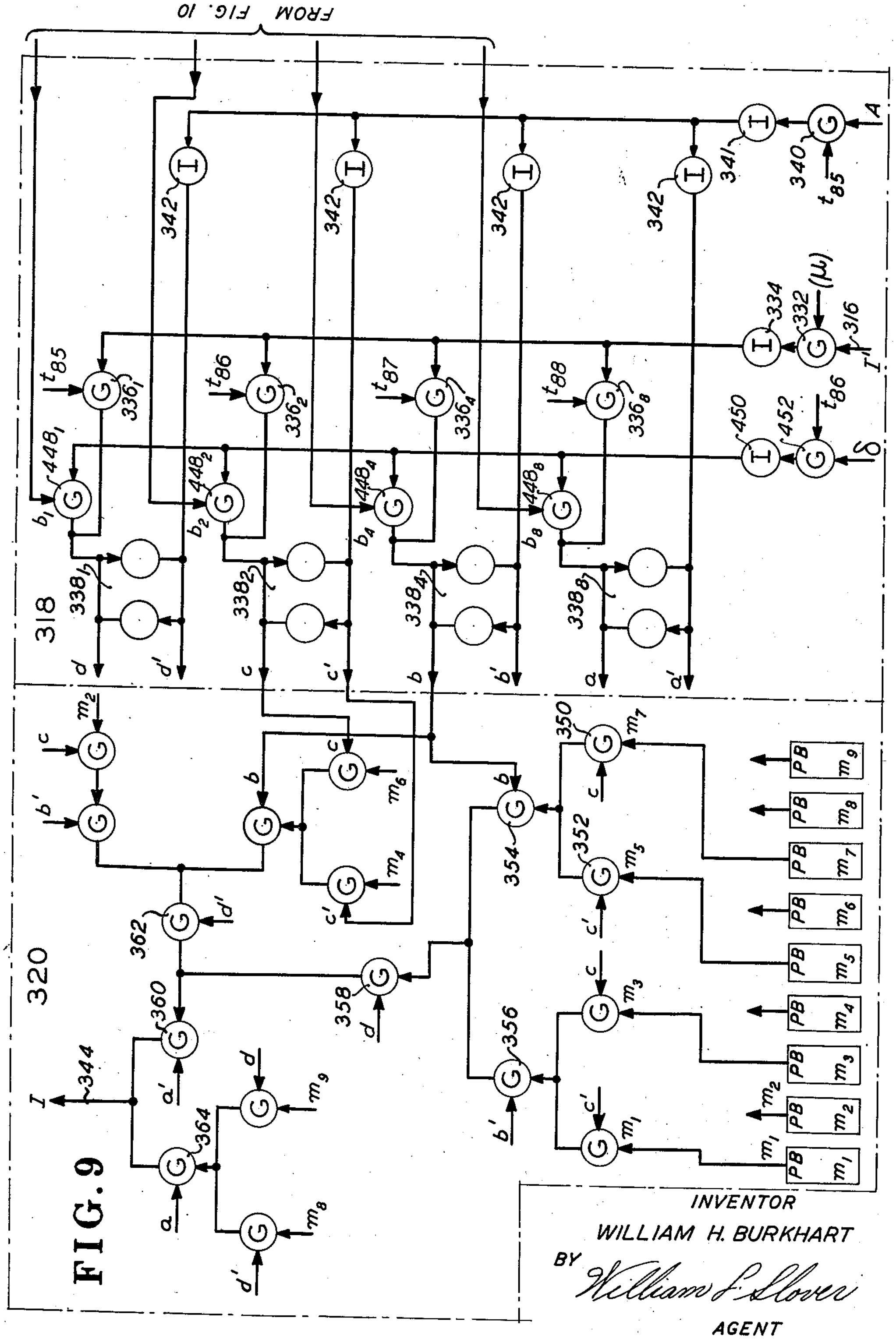
Figure 10:
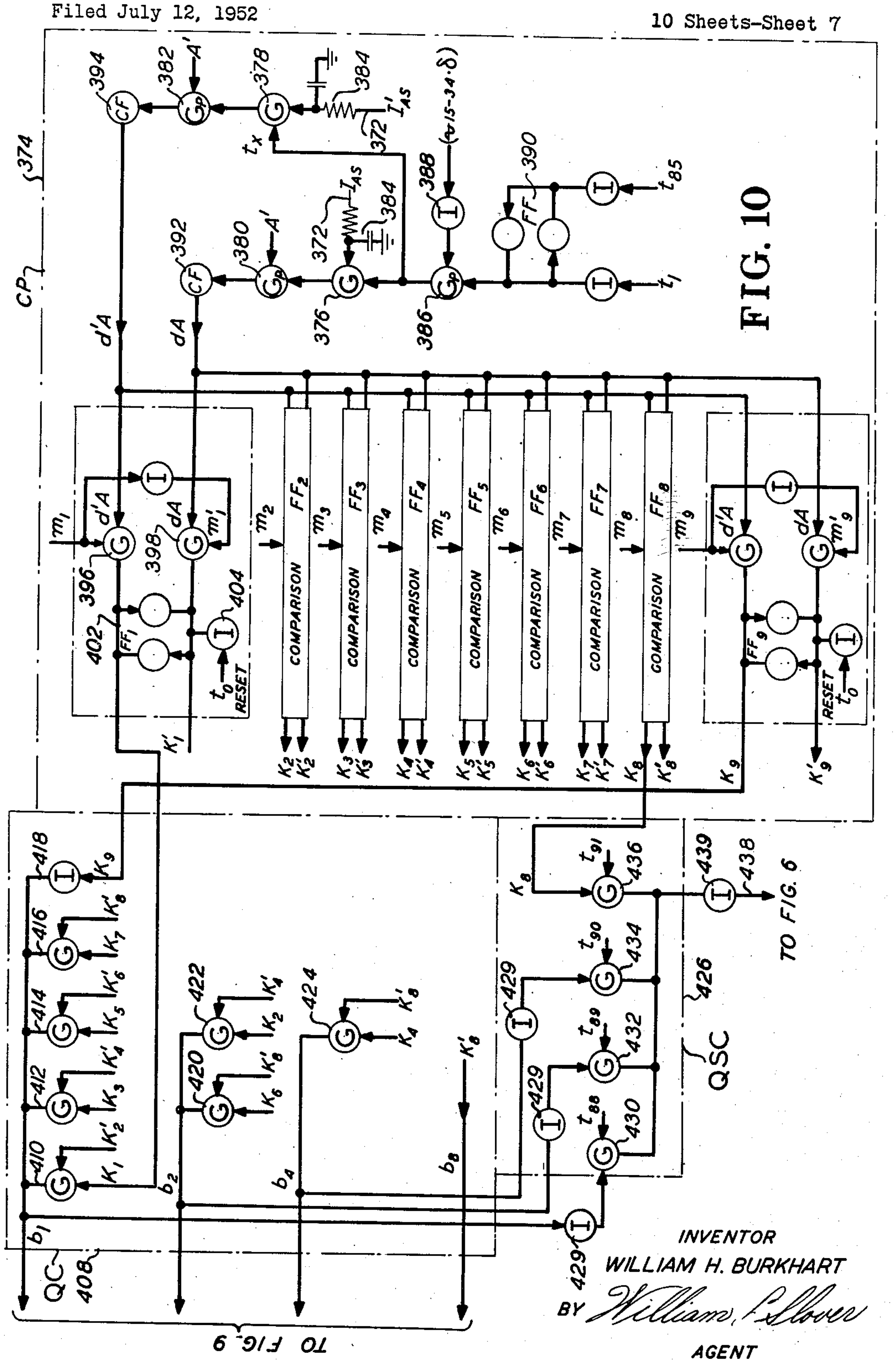
Figure 11:
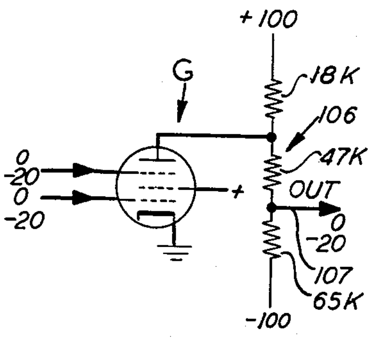
Figure 12:
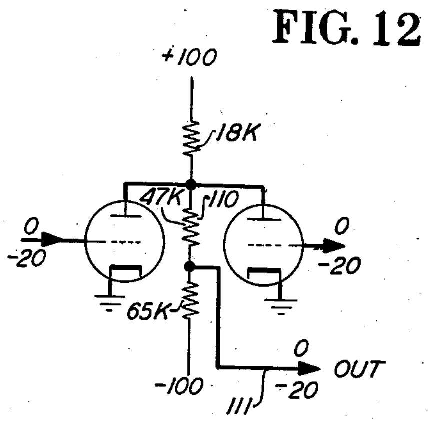
Figure 13:
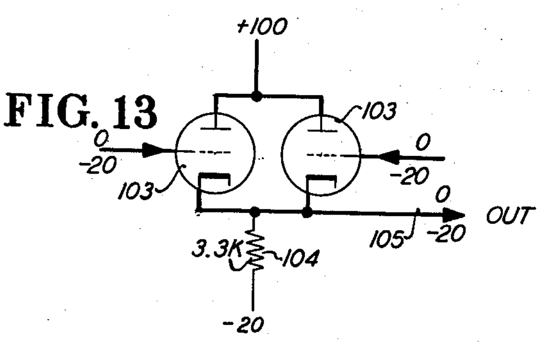
Figure 14:
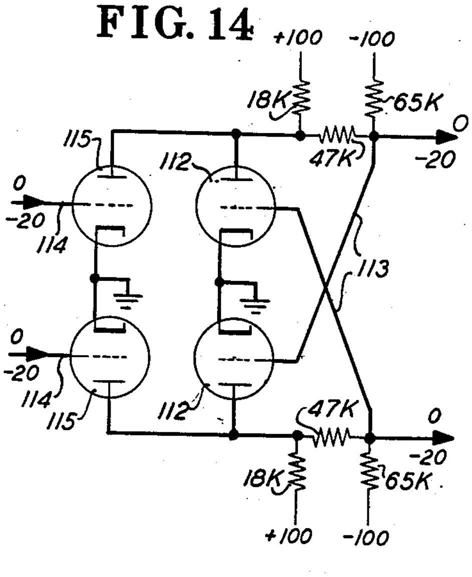
Figure 15:
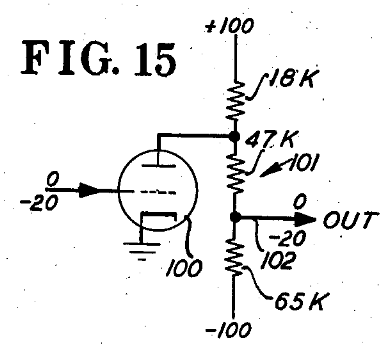
Figure 16:
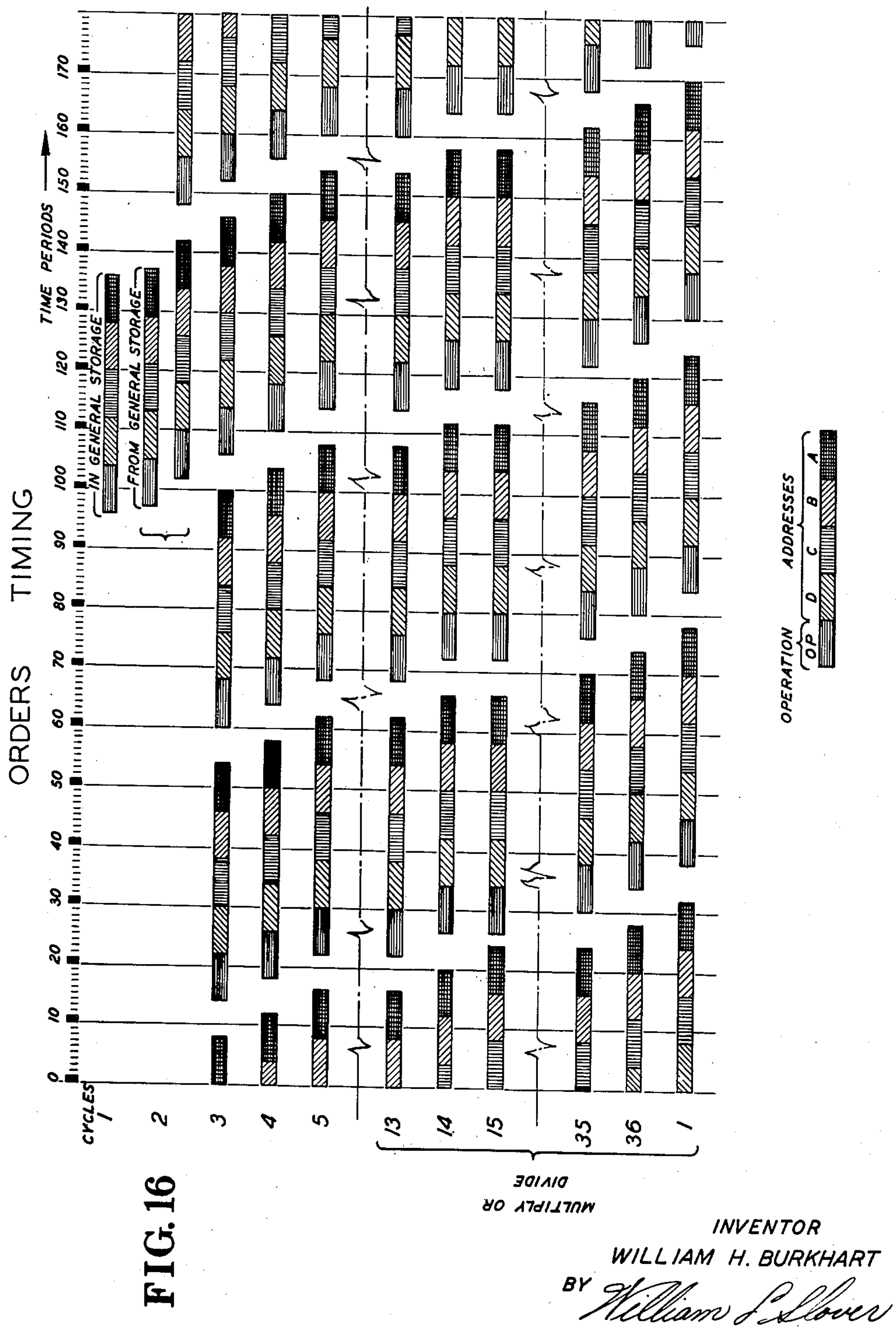

Figs. 9 and 10, taken together, are schematic wiring diagrams of the comparison circuit, the quotient control circuit, the quotient serial converter circuit, the multiples playback control circuit and the multiples playback selection circuit, all as shown in block form in Fig. 1;

Fig. 11 is a detailed wiring diagram of a pentode coincidence gate utilizing the means of the invention;

Fig. 12 is a detailed wiring diagram of a plate connected type coincidence gate used in the means of the invention;

Fig. 13 is a detailed wiring diagram of a cathode follower type OR gate used in the means of the invention;

Fig. 14 is a detailed wiring diagram of a bi-stable flip-flop with pullers for setting and resetting the same, all as used in the means of the invention;

Fig. 15 is a detailed wiring diagram of a triode inverter as used in the means of the invention;

Fig. 16 is a flow chart which illustrates the manner in which orders control the operation of the computer; and, Fig. 17 illustrates a sample problem of division as performed by the means of the invention.

Before entering into a detailed description of the means of the invention, it is deemed desirable, first, to describe certain circuit elements which are connected together in various combinations to make up the said means.

Referring to Fig. 15, there is illustrated an electronic inverter which in the other figures is represented by an encircled "I." As shown, the inverter consists of a triode 100 of suitable type having its cathode grounded and its anode applied to the juncture of the two positivemost sections of a three-section voltage divider 101. Said voltage divider is connected across sources of +100 and −100 volt potentials and has an output line 102 projected from the center tap thereof. Utilizing the resistor values indicated in the drawings, the application of a 0 volt potential to the grid of the triode to effect conduction of the latter causes output line 102 to assume a potential of approximately −20 volts. Application of a −20 volt potential to the grid of the triode, however, cuts off the latter and the potential of output line 102 rises to approximately 0 volts. In the present embodiment of the invention, potentials of 0 volts and −20 volts are used throughout and, for convenience, will hereinafter be referred to as "high" and "low" respectively.

Referring now to Fig. 13, there is disclosed an OR gate which in the other figures is represented by an encircled "V." As shown, the OR gate consists of a pair of triodes 103 having their cathodes commonly connected through a resistor 104 to a source of negative potential, say −20 volts. An output line 105 is projected from the connected cathodes. Application of a low potential (−20 volts) to the grids of both triodes maintains both in cutoff condition and output line 105 assumes a potential of approximately −20 volts. However, if a high potential (0 volts) is applied to the grid of either triode, the potential of output line 105 is raised by cathode follower action to approximately 0 volts. Obviously, several triodes may be connected with a common resistor 104 and output line 105.

Referring to Fig. 11, there is illustrated a coincidence gate which in the other figures is represented by an encircled "G." As shown, the coincidence gate consists of a pentode of suitable type having its anode connected to a three-section voltage divider 106 of the sort described above, and its cathode connected to ground. As before, an output line 107 is projected from the center tap of the voltage divider. The screen grid of the pentode is connected to a source of positive potential in the normal manner. The control and suppressor grids of the pentode, however, are connected to signal sources which assume the high and low potential levels of 0 and −20 volts. The simultaneous application of high potentials to both grids of the pentode effects conduction thereof and output line 107 assumes a low potential (−20 volts). Application of a low potential to either or both grids of the pentode effects cutoff of the latter and output line 107 assumes a high potential (0 volts).

Referring now to Fig. 12, there is illustrated a plate connected type gate which in the other figures is represented by an encircled "$G_p$." As shown, a pair of triodes have their anodes applied to a single voltage divider 110 which is provided with an output line 111 in the usual manner. A high output is produced on line 111 only when low potentials are simultaneously applied to the grids of both triodes. A low output is produced on line 111 when a high potential is applied to either or both triodes.

Referring now to Fig. 14, there is illustrated a bi-stable flip-flop which in the other figures is represented by a pair of circles and the letters FF and which will hereinafter be referred to as a flip-flop. As shown, the flip-flop consists merely of two inverters 112 of the type shown in Fig. 15, with the output 113 of each applied to the grid of the other. Input lines 114 are provided to the grids of puller tubes 115, plate to plate connected each with one of the flip-flop triodes. Puller triodes 115 are illustrated in Fig. 14 to indicate the connection thereof with the flip-flop, but it is to be understood that the term "puller" means any device to set or reset the flip-flop. Conduction of one of the flip-flop triodes maintains the other triode non-conductive by reason of the low potential (−20 volts) on the output line 113 of the conducting tube. Application of a high potential (0 volts) on the input line 114 of the puller for the non-conducting tube effects conduction of the former and lowers the potential at its anode and, therefore, the potential of the output line of the non-conducting flip-flop tube, to the point where the conducting flip-flop tube is cut off, and the conductive states of the tubes reverse. Application of a low potential (−20 volts) to one of the input lines 114 is ineffective in so far as changing the state of the flip-flop is concerned.

It is to be understood, of course, that the circuits described above are merely by way of example and are readily replaceable by other circuits which accomplish the same results.

It is thought that in certain instances wherein compound gating circuits are made up of straightforward combinations of the basic circuits described above, the use of a single symbol which accurately depicts the makeup and function of the entire circuit will greatly facilitate an understanding of the invention. For example, a circuit which is to pass a signal A only at B time of cycle C of a division or multiplication operation, may include a pentode coincidence gate to which signal A and time signal B are applied, an OR gate to which signals $\delta$ and $\mu$ indicative of division and multiplication operations are applied, an inverter to which the output of said coincidence gate is applied, a second coincidence gate to which the outputs of the OR gate and the inverter are applied, and a second inverter controlled by the output of the second coincidence gate to produce a high signal equivalent to the signal A applied to the circuit. This arrangement or any other combination of the described basic circuits having the same result may be conveniently depicted by an appropriately labeled coincidence gate symbol as follows:

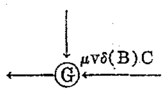

Symbols differing from the foregoing only in the descriptive legends applied to the inputs thereof, are used in the drawings for the purpose aforesaid.

*The computer in general*

The means of the invention, although not limited to use in any particular computer, are disclosed as embodied in a computer to which they are especially well adapted. This computer is serial in form of operation and utilizes the coded decimal (1, 2, 4, 8) system of notation. A keyboard 120 (Fig. 1) or another input device serves to enter numbers and orders, a digit at a time, into intermediate storage units 121 and 122 respectively wherein the several digits of each number and order are assembled in proper order for transfer to a selected location in a general storage device 123.

The general storage device is a multichannel magnetic storage drum of the sort disclosed in the patent to Cohen et al. #2,540,654, and consists of a rotating cylindrical member having a homogeneous magnetic coating on its circumferential surface. The magnetic surface of the drum is divided into a series of contiguous peripheral channels each having recording and playback means associated therewith. The rotational speed of the drum being constant, each rotation of the drum consumes a definite number of equal time periods, in the present instance, one hundred eighty, during each of which an area or cell of each channel is positioned adjacent the recording means to be magnetized thereby. As disclosed in the Cohen patent, a cell or area is magnetized with one polarity to indicate binary one and with the opposite polarity to indicate binary zero.

Figures 5, 6:
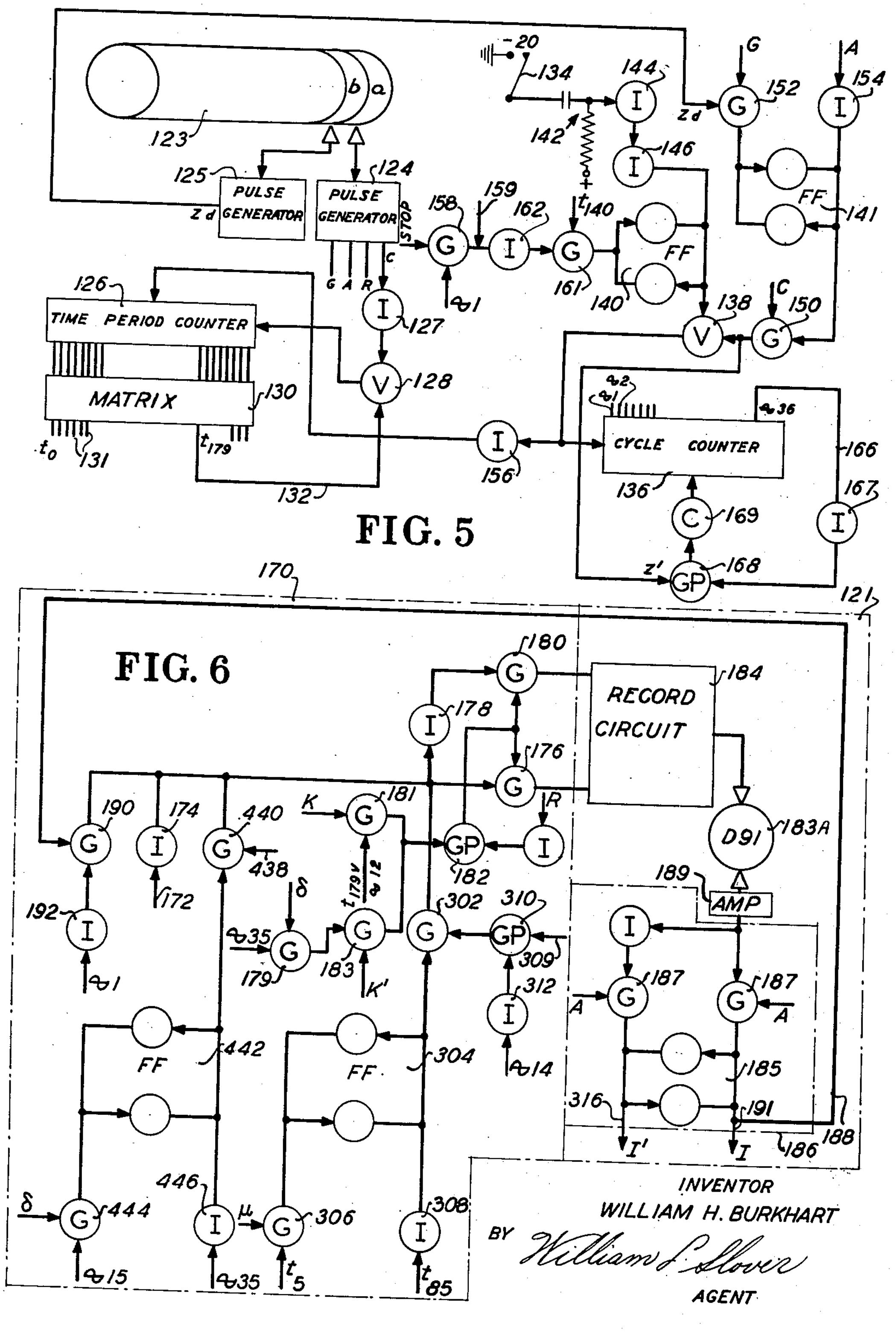
Fig. 5 is a schematic wiring diagram which illustrates the timing control means of the computer in which the means of the invention is embodied.
Fig. 6 is a schematic wiring diagram of a precessing storage unit and the controls therefor, the same being shown in Fig. 1 in block form.

In order to synchronize the recording and playback means for the several drum channels with the rotation of the drum and for other reasons to become apparent hereinafter, one channel of the drum, that designated *a* in Fig. 5, is provided with a full complement on one hundred eighty magnetized spots. A second channel of the drum, that designated *b*, is provided with a single magnetized spot empirically positioned to signify the completion of each rotation of the drum.

Figures 7, 8:
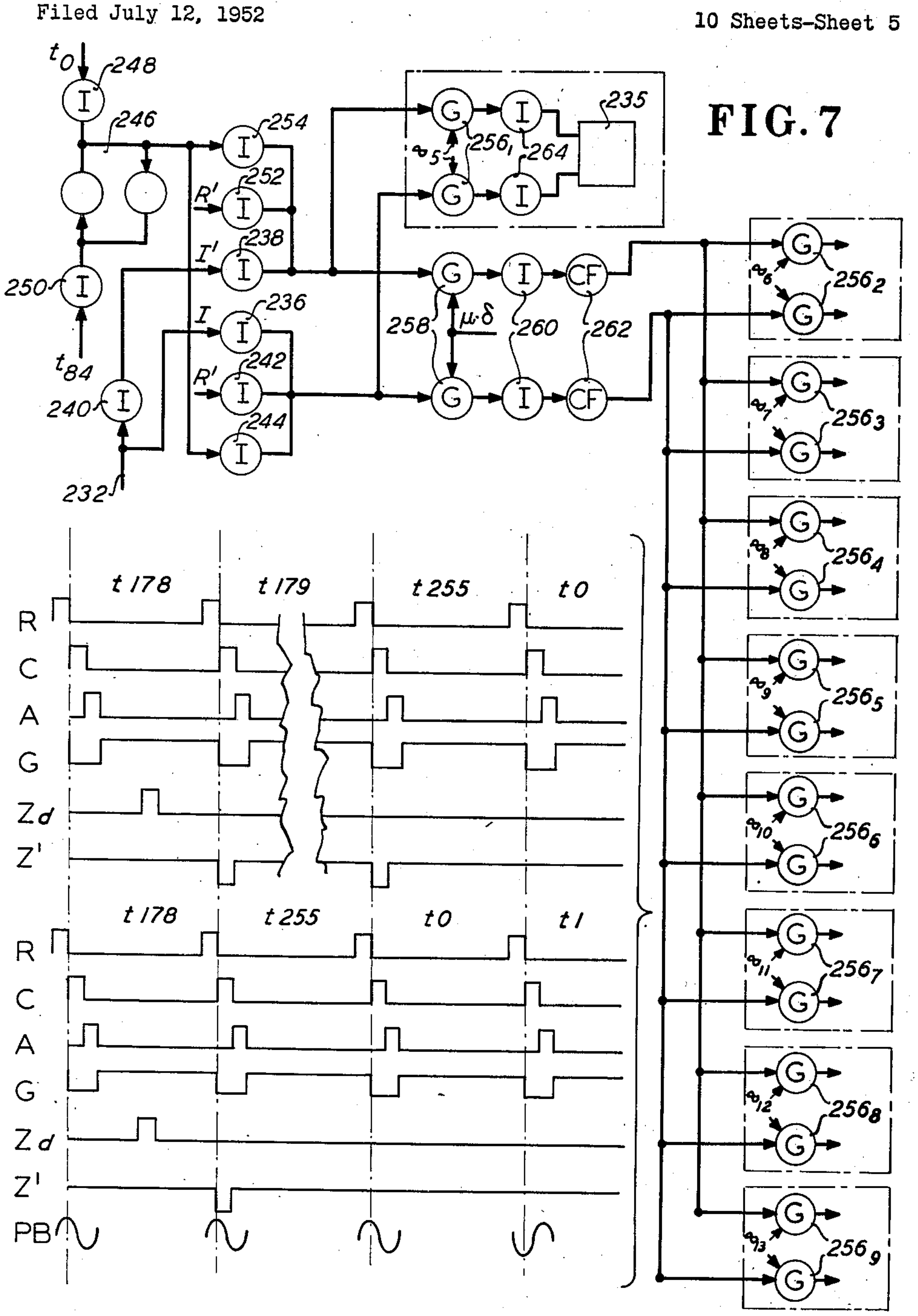
Fig. 7 is a schematic wiring diagram of the circuitry for recording the several multiples of a multiplicand or divisor.
Fig. 8 is a pulse chart which illustrates the timing of the computer in which the means of the invention are embodied.

Drum channel *a* has associated therewith a reading head which drives a pulse generator 124 adapted to produce pulse trains C, R, A and G as shown in the pulse diagram of Fig. 8. Drum channel *b* is provided with a reading head which drives a pulse generator 125 adapted to produce the pulse train $Z_D$ of Fig. 8. It is to be noted that the pulse trains produced by pulse generator 124 have a frequency of 180 per revolution of the drum, whereas the $Z_D$ pulses from pulse generator 125 have a frequency of one per drum revolution.

In order to facilitate the further description of the means of the invention, it will be assumed that each C pulse from generator 124 initiates a time period which terminates on the occurrence of the next following C pulse. There are, of course, 180 such time periods and they are numbered $t_0, t_1, \ldots, t_{179}$. As will appear hereinafter, however, time period $t_{179}$ is sometimes referred to as time period $t_{255}$.

Pulse generators 124 and 125 may be of any suitable sort adapted to produce the type of pulses indicated in Fig. 8. For example, pulse generator 124 may include means for developing the R pulses and multivibrators or the like for developing the delayed pulses C and A, and also inversion means to form the G pulses which, it will be noted, span the C and A pulses.

The principal purpose of the pulse train C is to advance a time period binary counter 126 one step for each pulse. This counter may be of any ordinary sort. In the present instance, counter 126 is advanced by negative pulses. Therefore, the positive C pulses from generator 124 are applied to an inverter 127 whose output is delivered to the counter through an OR gate 128. Inasmuch as counter 126 is advanced one step by each C pulse, the state thereof at any particular time is an accurate indication of what time period of drum revolution the computer has reached. Therefore, output lines from the several stages of the counter are applied to a matrix 130 whose outputs 131 are usable for timing purposes. Matrix 130 preferably is constructed of diodes and includes among its output lines 131 one that assumes a high potential during each time period or group of time periods that is pertinent to the timing control of the computer. Matrices of this sort are well known and need not be discussed further.

In order for binary counter 126 to count through 180 steps (0–179) during each of selected revolutions of drum 123, the same must include eight stages which ordinarily would enable the counter to count through 256 steps, that is, from 0 to 255. Means are provided, therefore, either to stop the counter when it reaches a count of 179 during the last time period of each cycle, or to skip the counter to capacity (255) at such time. The former mode of operation is utilized whenever the next rotation of the drum is not to be utilized by the computer, as, for example, on the last cycle of each calculation; and the latter mode of operation is utilized whenever the next rotation of the drum is to be utilized for a cycle of operation. Obviously, if counter 126 is skipped to count 255 at the beginning of what would otherwise be time period $t_{179}$, the output of matrix 130 will not indicate time period $t_{179}$ but rather will indicate time period $t_{255}$.

The means whereby counter 126 is stopped at 179 includes an output line 132 of matrix 130 which is high only when said counter stands at 179 and which is applied to OR gate 128 and maintains the output of the latter high continuously. Obviously, the inverted C pulses from pulse generator 124 are ineffective to advance the counter when this condition exists, and matrix 130 continues to indicate time period $t_{179}$ even though drum 123 does not stop rotating.

The means whereby counter 126 is skipped to capacity (255) are under control of the A, C, G and $Z_D$ pulses from pulse generators 124 and 125 and, also, under control of a calculating key 134 whose purpose it is to overcome the effect of stopping the counter at 179. The said means include, among other things, a binary cycle counter 136 which is advanced one step for each revolution of drum 123 during a calculation operation, and also one step for each digit transmitted to the computer from the keyboard during keyboard operations.

An OR gate 138 whose output, when low, advances counter 136 is under the joint control of a Go circuit flip-flop 140 and a timing control circuit that includes a flip-flop 141. Go flip-flop 140 is set to apply a low potential to gate 138 under control of Calculate key 134 and, as will presently appear, is not reset during calculating operations until a stop signal which signifies the end of the calculation is provided. Key 134 normally connects a source of negative potential, say −20 volts, to a differentiator circuit 142 of which the resistor is connected to a source of positive potential. The output of the differentiator is applied to the grid of an inverter 144 which controls a puller 146 for Go flip-flop 140. When the Calculate key is operated, it connects a source of ground potential to the differentiator and a positive pulse is applied to inverter 144, but to no avail as the positive potential applied to the resistor of the differentiator circuit normally maintains the inverter conductive. However, when the key 134 is restored to normal, a negative pulse is applied to inverter 144 to cut off the same momentarily, and puller 146 sets flip-flop 140 which applies a low potential to OR gate 138. The other input of OR gate 138 stems from a coincidence gate 150 to which the output of flip-flop 141 and also the C pulses from pulse generator 124 are applied. Flip-flop 141 is set to apply a high potential to gate 150 by a coincidence gate puller 152 which, of course, utilizes the voltage divider of the flip-flop triode to which it is connected. The $Z_D$ pulses from generator 125 and the G pulses from generator 124 are applied to gate 152 to effect conduction of the same and, therefore, setting of flip-flop 141 during time period $t_{178}$ of each cycle, this being the only time at which the $Z_D$ and G pulse lines assume high potentials coincidentally, see Fig. 8. Flip-flop 141, having been set during time period $t_{178}$, applies a high potential to gate 150 during the remainder of said time period and into the beginning of the next following time period when the occurrence of a C pulse effects conduction of said gate and, therefore, the application of a low potential to OR gate 138. Remembering that flip-flop 140 has also been set to apply a low potential to OR gate 138, the latter produces a low output which advances cycle counter 136 one step.

In order to reset timing flip-flop 141 prior to the next succeeding C pulse, a reset puller 154 is connected thereto and is controlled by the A pulses from pulse generator 124. It will be noticed that the A pulse immediately follows the C pulse during each time period, so that flip-flop 141 is reset immediately following the C pulse which effects conduction of gate 150 to advance counter 136. The output of OR gate 138 is also applied through an inverter 156 to the several stages of time period counter 126 to skip the latter to capacity (255) each time cycle counter 136 is advanced. It is to be noted that the advance of cycle counter 136 and skipping of time period counter 126 to capacity are effected by the C pulse which occurs at the beginning of the last time period of a drum revolution, which pulse is the one that otherwise would advance the time period counter to 179. Therefore, a time period $t_{179}$ occurs only when the cycle counter is not advanced to initiate a cycle of operation on the next revolution of drum 123 (Fig. 8). When a time period $t_{179}$ does occur, however, it lasts for an indefinite period of time until the C pulse occurring during the last time period of a succeeding rotation of the drum is effective to advance the cycle counter and to skip the time period counter to capacity, see Fig. 8.

The Go flip-flop 140 is reset at appropriate times to prohibit further advance of cycle counter 136 and to prevent skipping of time period counter 126 to capacity. Means to this end include a coincidence gate 158 to which an output of cycle counter 136, that is high on cycle one, is applied along with a stop signal from any suitable source such as an operation control unit 160 (Fig. 1) controlled by orders entered into the computer. The output of gate 158 is applied to an inverter 162 which, when the gate becomes conductive, applies a high output to a coincidence gate 161. Also applied to gate 161 is a signal line from one of the outputs 131 of matrix 130 that is high during time period $t_{140}$. Therefore, if on cycle one a stop signal is applied to gate 158, then during time period $t_{140}$ flip-flop 140 is reset and applies a high potential to OR gate 138. This high potential is passed on to the input of cycle counter 136 to prevent advance thereof and to the inverter 156 which controls skipping of time period counter 126 to capacity to prevent such skipping.

Also applied to the grid of inverter 162 is a signal line 159 which assumes a low potential on each cycle of keyboard operation on which a digit is transmitted to the computer. The means controlling the line 159 may be of any suitable sort, such for example, as those shown in the afore-cited application Serial No. 270,876. For present purposes it is sufficient to understand that line 159, by effecting resetting of Go flip-flop 140, limits the advance of cycle counter 136 to one step, and permits counter 126 to skip to capacity only once for each digit entered through the keyboard. As will presently appear, multiplication and division operations with the means of the invention each consume 36 cycles of drum 123. Evidently counter 136 must be able to count to 36 which if, as here, said counter is binary in form, requires that the same have a capacity of 64 ($2^6$). Therefore, means are provided to reset counter 136 to its initial "one" count each time it has reached the count of 36. An output line 166 of said counter, which is high when the same stands at 36, is applied through an inverter to a plate connected type coincidence gate 168 whose output, in turn, is applied to the grid of a cathode follower 169 whose purpose it is to reset the cycle counter to its initial one count. The cathode follower may be substantially identical with either half of the OR gate described hereinabove. The other input of gate 168 is taken from gate 150 which, it will be remembered, conducts only at C pulse time of the last time period of each cycle of drum 123. The effect of this connection, which in the pulse chart of Fig. 8 is represented by the line Z', is to reset cycle counter 136 at exactly the same time of cycle as the same would be advanced under the circumstances described earlier.

In view of all of the above, it will be seen that there is always available to the computer the several pulse trains described, and also reference pulses indicative of the cycle and the time period on which the computer is currently standing.

Referring now to Figs. 1 and 6, the intermediate storage device, whereby information, entered into the computer from keyboard 120 with random timing, is synchronized with the computer for delivery to the general storage drum 123, will now be described briefly. First, however, it is to be mentioned that the numbers handled by the computer, in the present instance, contain 20 digits, 10 on either side of a decimal point, and that the orders or instructions each contain 10 digits, 2 digits for address A, 2 for address B, 2 for the operation to be performed, 2 for the address C in which the result of said operation is to be stored and 2 for the address D of the next order. It is also to be mentioned that when entering numbers into the computer through the keyboard, counter 136 is utilized for counting digits rather than cycles, that is, it counts only those cycles during which a digit is delivered to the computer and never advances beyond 11 except on depression of a suitable key which controls the transfer of a number or an order from the intermediate storage device to the general storage drum, at which time the counter advances to 12. The use of 20 digit numbers does not violate this rule because the cycle counter is reset by appropriate decimal locating means between the entries of the 10th and the 11th digits of a number, all as described in the afore-cited copending application Ser. No. 270,876.

The intermediate number storage unit 121 is shown in Fig. 1 as a block with the legend D92 therein. This D92 indicates a delay of 92 time periods between the delivery of information to the unit and the exit of the same information therefrom. In like manner, the D46 associated with intermediate orders storage unit 122 in the drawings indicates a delay of 46 time periods.

Associated with the intermediate numbers storage unit 121 is a number control unit 170 which is adapted to receive information from several sources alternatively, as will be described at appropriate points in the description. Information from keyboard 120 in the form of negative pulses during the appropriate ones of a group of four time periods, in the present instance $t_{88}$, $t_{89}$, $t_{90}$, and $t_{91}$, is relayed over a line 172 to an inverter 174 in unit 170 (see also Fig. 6). The output of this inverter 174 is applied directly to a gate 176 and through an inverter 178 to a second coincidence gate 180. The outputs of gates 176 and 180 are applied to the record circuit of intermediate storage unit 121. Also applied to the gates 176 and 180 is the output of a control circuit whose purpose it is to prevent recording of information in the intermediate storage device 121 at certain times. This control circuit includes a plate connected type coincidence gate 182 to which inverted R pulses from pulse generator 124 (Fig. 5) are applied to accurately time the recording of information. Also applied to gate 182 is a signal which is high only at those times when it is not desired to record information. The means for making up this signal include a coincidence gate 179 which conducts only on cycle 35 of division operations, and a pair of coincidence gates 181 and 183 whose plates are connected to gate 182 through a common voltage divider. Gate 181 conducts only on keyboard operations except during time period $t_{179}$ of each cycle and during all of cycle 12. Gate 183 conducts only when the computer is not on keyboard operations and the gate 179 is cut off. Evidently recording can be effected only when one of the gates 181 or 183 conducts. Other means may be provided to care for other conditions if required.

In the present instance, storage unit 121 includes a magnetic disc which may be on the shaft of drum 123 and is, in effect, a channel of said drum. Associated with the said disc is a record circuit 184 which is driven by the coincidence gates 176 and 180, and which may be of any known construction. Also associated with the disc is a playback circuit 186 which includes an amplifier section and a flip-flop memory section that is set and reset at A pulse time of each cycle in accordance with the amplified information. Said flip-flop section includes a flip-flop 185, a pair of coincidence gate pullers 187 which are jointly controlled by the A pulses and the amplifier section, and an inverter to apply the output of the amplifier section to one of the gates in inverted form. Referring to Fig. 8, the output wave PB of the amplifier section includes, for each spot recorded on the disc, a positively directed lobe and a negatively directed lobe whose order of occurrence indicates the polarity of the magnetized spot. As shown, the peak of the latter lobe of each siganl wave coincides with an A pulse and effects appropriate setting or resetting of the flip-flop 185 which indicates throughout the remainder of the time period of said A pulse and until the occurrence of the A pulse during the next following time period, the value of the played back signal as binary one or binary zero.

It will be noted from the above that recordings made at R pulse time, which is the final portion of each time period, are played back to the flip-flop 185 at A pulse time, which occurs early in each time period. In practice, the generator 124 (Fig. 5) which produces the A pulses is adjusted so that the latter occur coincidently with the peaks of the later lobes of the signal waves after the time relation of said peaks to the R pulses has been determined. The pole pieces associated with record circuit 184 and playback circuit 186 are so disposed relative to one another and the periphery of disc 183A that a delay of 92 time periods is effected between the recording of a spot and the appearance of a signal indicative thereof at the output of the playback circuit.

The output of playback circuit 186, besides leading to the general storage drum 123, is coupled back over a line 188 to a coincidence gate 190 in the numbers control unit whose output is connected to the inverter 178 and the coincidence gate 176. The second input of gate 190 is an output of an inverter 192 which is controlled from cycle counter 136 (Fig. 5) in such manner as to conduct only on cycle one, at which time it is not desired to feed information back from playback circuit 186 to the record circuit 184.

Obviously, information recorded on disc 183A during time periods $t_{88}$–$t_{91}$ of one cycle is played back and re-recorded during time periods $t_0$–$t_3$ of the next cycle, and again during time periods $t_{92}$–$t_{95}$ of the said next cycle. In order that only this four time period precession is obtained between successive deliveries of digit representative pulses from the keyboard, the latter effects application of a high potential to gate 182 on all cycles of keyboard operation except those on which a digit actually is being delivered to the computer. Means to this end are described in the copending application Serial No. 270,876 to William Burkhart et al. Obviously, therefore, each digit, after it is recorded, is precessed to make room for the next digit. After all twenty digits of a number have been recorded, they are transmitted to a selected channel of the general storage drum during time periods $t_0$–$t_{79}$ of the appropriate cycle, namely cycle 12. Referring to Fig. 1, the output of playback circuit 186 (Fig. 6) of intermediate storage device 121 is applied over a line 191 to a coincidence gate 199 which is opened during time periods $t_0$ to $t_{79}$ of cycle 12 of keyboard number entry operations. Conveniently, keyboard 120 may have an output line 193 which assumes a high potential only during number entry operations and another 195 which assumes a high potential only during orders entry operations. Gate 199 is also opened at other times as will be explained hereinafter. The output of gate 199 is applied to a record circuit 194 which is common to the several channels of drum 123, and which is connected to the selected one of said channels by a selection circuit 196 which may be a relay pyramid of standard design. Operations of said pyramid to select desired channels are under the influence of a control circuit 197 which is controlled by a selector switch on the keyboard and by orders fed into the machine, in the manner set forth in the copending application to Joseph McCarroll et al. Serial No. 255,712. Pyramid 196 also operates to connect a selected channel with a playback circuit which is here shown in two sections, the first, labeled 198, being the record amplifiers and the second section, labeled 200, being the flip-flop memory portion of the circuit.

The intermediate orders storage device 122 is substantially identical to that just above described, except that the effective delay amounts to only 46 time periods. It will be noted that this arrangement also represents a four time period precession between the recording of one orders digit and the recording of the next following orders digit. For example, an orders digit transmitted from the keyboard for recording during time periods $t_4$ to $t_7$ is re-recorded during time periods $t_{50}$–$t_{53}$, $t_{96}$–$t_{99}$ and $t_{142}$–$t_{145}$ of the same cycle and again during time periods $t_8$–$t_{11}$ of the next cycle. The output of the intermediate order storage device is applied to an operation control unit 160 which, by suitable gating during calculating operations, accepts only that portion of each order which refers to machine operation, and which includes means, say flip-flops, for generating a continuous indication of the operation to be performed. For example, said unit is here shown as having three outputs, one marked M for multiplication, one marked D for division and the other marked Stop. Hereinafter, it will be assumed that these three output lines have high potentials applied thereto selectively for controlling the machine operations peculiar to each. The output of said magnetic intermediate orders storage is also applied over a line 202 and through a gate 203 to control circuit 197 to effect suitable control of the selection pyramid 196. Gate 203 is opened during time periods $t_0$–$t_7$ of cycles 1, 3, 13 and 35 of calculating operations to pass at each opening the address portion of the order then being transmitted from the intermediate orders storage device. Line 202 is also connected to a coincidence gate 206 whose output is applied to the record circuit 194 and which is opened to permit passage of signals during time periods $t_{96}$–$t_{135}$ of cycle 12 of keyboard operations on orders, this being the time that orders assembled in the intermediate storage device are transferred to the general storage drum.

Recording of orders in intermediate storage unit 122 is controlled by orders control unit 173 which may be arranged in the same manner as numbers control unit 170 to permit recording and precessing of orders only during appropriate cycles. Referring to the orders timing chart of Fig. 16, it will be seen that on multiplication and division operations, it is desired to precess orders on all cycles save cycles 5 to 12 and 15 to 34. The reasons for this will become apparent hereinafter. The internal construction of orders control circuit 173 will not be described as it is deemed sufficient for an understanding of the invention to indicate the results obtained thereby, particularly since the similar numbers control circuit is illustrated and described.

It will be seen, therefore, that the means thus far described are operable to enter numbers and orders into the computer digit by digit to assemble the whole numbers and orders and to shift said assemblages to selected channels in the general storage drum, wherein each number is recorded during time periods $t_0$–$t_{79}$ and each order is recorded during time periods $t_{96}$–$t_{135}$. The playback means 198 and record means 194 for the general storage drum utilize but a single pole piece for each drum channel, which results in that each number is available for use by the computer during time periods $t_1$–$t_{80}$ and each order is available during time periods $t_{97}$–$t_{136}$, it being remembered that the flip-flop memory 200 for playback amplifier 198 is set or reset at A pulse time of each time period in accordance with the polarity of the magnetic spot which began controlling the amplifier at the end of the preceding time period.

Figure 2:
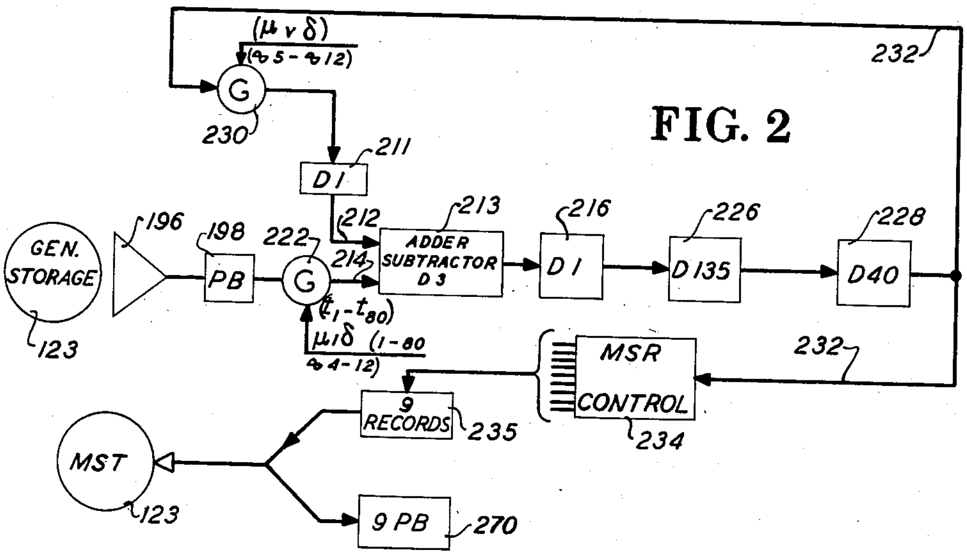
Fig. 2 is a block diagram of that portion of the means of the invention which is concerned with forming the multiples of a multiplicand or divisor.

Prior to an operation of the computer, the control unit 197 for general storage selector circuit 196 is set up manually in the manner described in the afore-cited McCarroll application to permit playing back of an order from a selected channel of the drum. This order is played back during time periods $t_{97}$–$t_{136}$ of cycle 2 of the computer operation as indicated in the orders timing diagram of Fig. 16, cycle 1 being the stopped condition of the computer. The output of playback unit 198, 200 is applied to a coincidence gate 210 which, as shown in Fig. 1, is opened during time periods $t_{97}$–$t_{136}$ of cycle 2. The output of gate 210 is applied to a one time period delay circuit 211 which may be of ordinary flip-flop construction, and whose output is applied to one input terminal 212 of an adder-subtracter 213 (Figs. 1 and 2). Preferably, adder-subtractor 213 is the one shown in the copending application Serial No. 226,700 to William Burkhart although, if desired, other adder-subtracters can be utilized. For present purposes, it is sufficient to understand that information is advanced through the adder-subtracter by the A pulses and that the adder-subtracter 213 will produce an output signal indicative of the digital sum or difference of two digital signals applied, one to input terminal 212 and the other to an input terminal 214. Therefore, the same will not be redescribed herein. As described in the aforementioned application Serial No. 226,700, adder-subtracter 213 is, in effect, a three time period delay so that the order applied to terminal 212 thereof during time periods $t_{98}$–$t_{137}$ of cycle 2 appears on the output line 215 of the added-subtracter during time periods $t_{101}$–$t_{140}$, see Fig. 16. Output line 215 is applied through a one time period delay circuit 216 to an input of the orders control unit 173. Therefore, the said order is recorded in the intermediate orders storage device during time periods $t_{102}$–$t_{141}$ of cycle 2, as indicated on the orders timing diagram. The order thus recorded in the intermediate storage device is precessed as described above so that on cycle 3 the two last recorded digits thereof are played back during time periods $t_0$–$t_7$, and signals indicative thereof are transmitted over line 202 and through gate 203 to the control unit 197 for the channel selection circuit 196. This signal sets up the selection circuit in such manner as to effect playback of the first number A to be utilized in a calculation. It is to be noted that gate 203 does not again open to permit passage of a bi-digit signal until cycle 13. During time periods $t_{14}$–$t_{21}$ of cycle 3, the two digits of the order pertaining to the operation to be performed are played back from storage device 122 and signals indicative thereof are transmitted to operation control unit 160 through a coincidence gate 220 which is open at said time. Therefore, operation control unit 160 is set up to indicate on an output line thereof the operation to be performed by the computer on the number A and a second number B which is to be obtained from the drum during a later cycle.

Selection circuit 196 having been set up during cycle 3, number A is played back from the drum and is applied to a coincidence gate 222 during time periods $t_1$–$t_{80}$ of cycle 4. Gate 222 is opened during time periods $t_1$–$t_{80}$ of cycles 4 to 12 of multiplication or division operations and, therefore, permits repeated passage of the pulse train indicative of number A. The output of gate 222 is applied to terminal 214 of adder-subtracter 213.

At this point it is deemed desirable to point out that the number A in a multiplication operation is the multiplicand and in a division operation is the divisor. Therefore, in accordance with the method of performing multiplication and division utilized by the means of the invention, it is desired to form the nine multiples of the number A whether the operation be multiplication or division. In the interest of clarity, it is deemed desirable to describe the means for forming the nine multiples of the number A before determining whether it is a multiplicand or a divisor, and before describing any of the means for co-action thereof with a multiplier or a dividend.

As described above, the output of adder-subtractor 213 is applied to a one time period delay circuit 216 (Figs. 1 and 2). The output of this delay circuit, besides being connected to the numbers and orders control circuits 170 and 173, is also applied to a 135 time period delay circuit 226. This output is, in turn, applied to a 40 time period delay circuit 228. Delay circuits 226 and 228 may be of any suitable sort, but preferably they constitute magnetic discs of the sort described in connection with intermediate storage device 121, no precessing means being provided, of course. The output of delay circuit 228 is applied to a coincidence gate 230 which is opened on cycles 5 to 12 of multiplication and division operations. The output of gate 230 is applied to the delay circuit 211 whose output, it will be remembered, is connected to terminal 212 of adder-subtracter 213. It is to be noted that the combined delays of adder-subtracter D3 and delay circuits 216, 226, 228 and 211 amount to 180 time periods. Therefore, the number A applied to terminal 214 of adder-subtracter 213 during time periods $t_1$-$t_{80}$ of cycle 4 is reapplied to the added-subtracter through terminal 212 during time periods $t_1$–$t_{80}$ of cycle 5. Further, it will be remembered that gate 222 through which the number A is played back from general storage is opened not only at the appropriate times during cycle 4, but also during cycles 5 to 12. Therefore, at the same time that the number is being applied to terminal 212 of the adder-subtracter after having traversed what will hereinafter be referred to as the D180 loop (Figs. 1 and 2), the same is also being applied to terminal 214 of the adder-subtracter. On cycle 5, therefore, there is produced on output line 215 of the adder-subtracter the sum of the number A added to itself. This sum also traverses the D180 loop and has the number A added to it during cycle 6, etc. until all nine multiples of the number A are formed. The D180 loop has a branch 232 which does not include the one time period delay circuit 211 and which is applied to a multiples storage record control unit 234 whose purpose it is to effect operation of the appropriate one of nine record circuits 235 in accordance with each multiple transmitted thereto. Before describing the multiple storage record control unit, it is to be noted that the several multiples are applied thereto during time periods $t_0$ to $t_{79}$ or $t_{83}$ of successive cycles 5 to 13. The reason for increasing the number of time periods involved from 80 to 84 is, of course, due to the fact that the multiples of number A may include one additional higher order digit.

Multiple storage record control unit 234 is illustrated in Fig. 7 and includes a pair of triodes 236 and 238 to the former of which the line 232 is applied and to the latter of which the signals on said line are applied through an inverter 240. The triode 236 forms with triodes 242 and 244 a three-way plate connected type coincidence gate. Triode 242 has applied thereto an inversion of the R pulse train from generator 124. Evidently, this inverter is cut off only at R pulse time which results in that the output of the gate of which it is a part can be high only at R pulse time. The third inverter 244 of the gate has the output of a flip-flop 246 applied thereto. Flip-flop 246 is set to apply a low potential to the triode at time period $t_0$ by a puller tube 248 and is reset to apply a high potential to the inverter at time period $t_{84}$ of each cycle by a puller 250.

The construction is such that the output of the gate 236, 242, 244 is high only when, at R pulse time of time periods $t_0$ to $t_{84}$, a low potential indicative of binary zero is applied to line 232. At all other times the output of the gate is low.

Gate 238 to which the inverted signals from line 232 are applied is combined with a pair of inverters 252 and 254 to form a second three-way plate connected type coincidence gate. Inverter 252 has the inverted R pulse train applied thereto and inverter 254 has the output of flip-flop 246 applied to it.

The construction of gates 254, 252, 238 is such that the output thereof assumes a high potential only when, at R pulse time of time periods $t_0$ to $t_{84}$, a high potential indicative of binary one is applied to line 232.

The outputs of the gates just described are applied to a first pair of coincidence gates $256_1$ and a second pair of coincidence gates 258. The gates 258 are conditioned for conduction all during multiplication and division operations and their outputs are applied through inverters 260 to a pair of cathode followers 262. The cathode followers have their outputs connected in parallel to eight pairs of gates 256. Evidently, counting the pair of gates $256_1$ above described, there are nine pairs of such gates. Each pair is associated with a channel of the storage drum and is given a subscript 1–9 to denote which one of the multiples is to be recorded in its channel. Gates $256_1$ are located in parallel with the gates 258 because the ones multiple recording channel is utilized in addition operations. This feature forms no part of the present invention, however, and need not be discussed further. All of the gates $256_{1-9}$ have their outputs applied to inverters 264 which drive recording circuits 266 adapted each to magnetize a discrete spot on the drum with either of two polarities depending on which of the inverters produces a high output. The inverters 264 and the record circuit 235 are illustrated only in connection with the ones multiple control gate 256, it not being deemed necessary to re-illustrate the same for all of the other gates 256. The record circuits may be of any suitable sort.

As thus far described, the multiples transmitted to the multiples storage record control circuit 234 are applied to all of the gates 256 at the proper times for recording. In order that only the appropriate multiple is recorded in each channel, the gates $256_{1-9}$ are conditioned for conduction each during the appropriate cycle 5 to 13 on which the associated multiple is transmitted thereto as described above. For example, the ones multiple is applied to the multiples record control circuit during cycle 5 and gates $256_1$ are conditioned for conduction during that cycle, and gates $256_2$ are conditioned for conduction during cycle 6, etc.

The construction is such that during time periods $t_0$–$t_{83}$ of cycles 5 to 13 the nine record circuits 235 are operated successively and all of the nine multiples are recorded on drum 123.

In the present instance, the same pole pieces which are driven by the record circuits 235 are utilized to control multiples playback circuits 270 (Figs. 1 and 2). The nine playback circuits 270 may be of the same sort as described above in connection with the intermediate numbers storage device except that only one flip-flop memory section 271 is provided for all nine, and is connected with the latter selectively as will be described hereinafter.

At this point it is to be mentioned that, if desired, the multiples may be formed by known shortcut methods; for example, "multiply by two, four, or five" circuits may be utilized to generate the multiples rapidly. Further, where, as in the present instance, the multiples are stored in laterally spaced channels or bands of the drum, the same may be stored in a plurality of channels interlaced within the same band of the drum.

Figure 3:
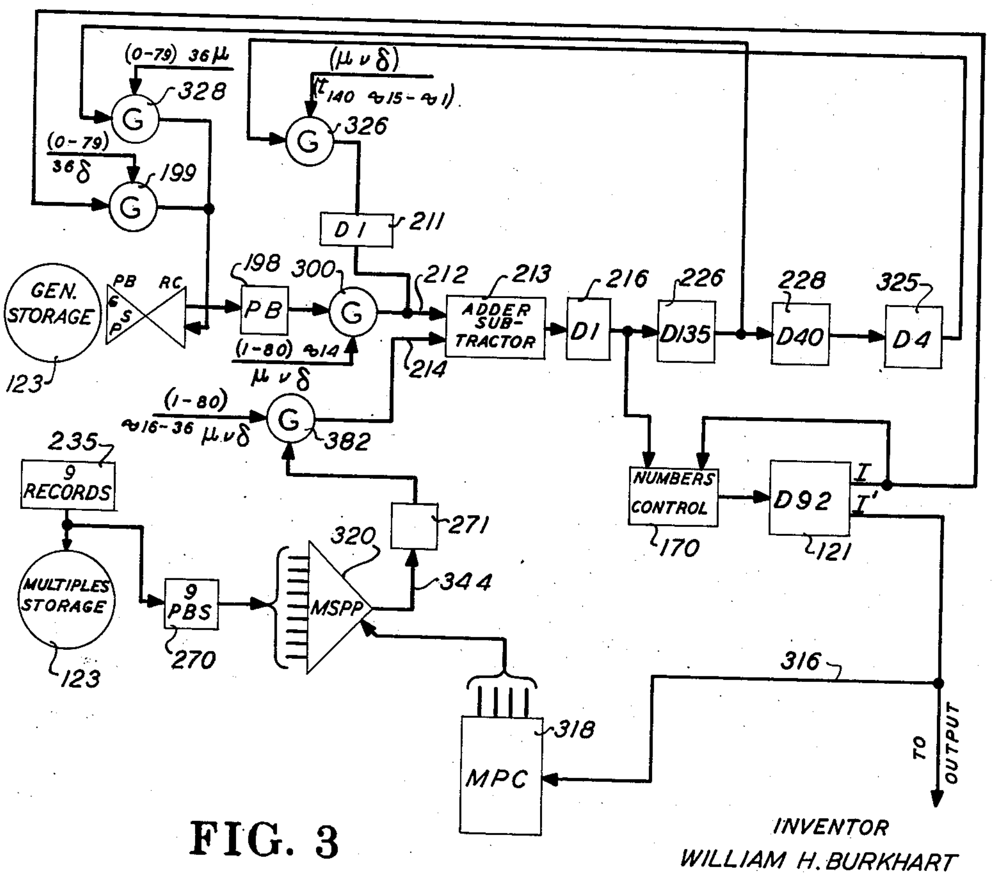
Fig. 3 is a block diagram of that portion of the means of the invention which is concerned with multiplication.
Figure 4:
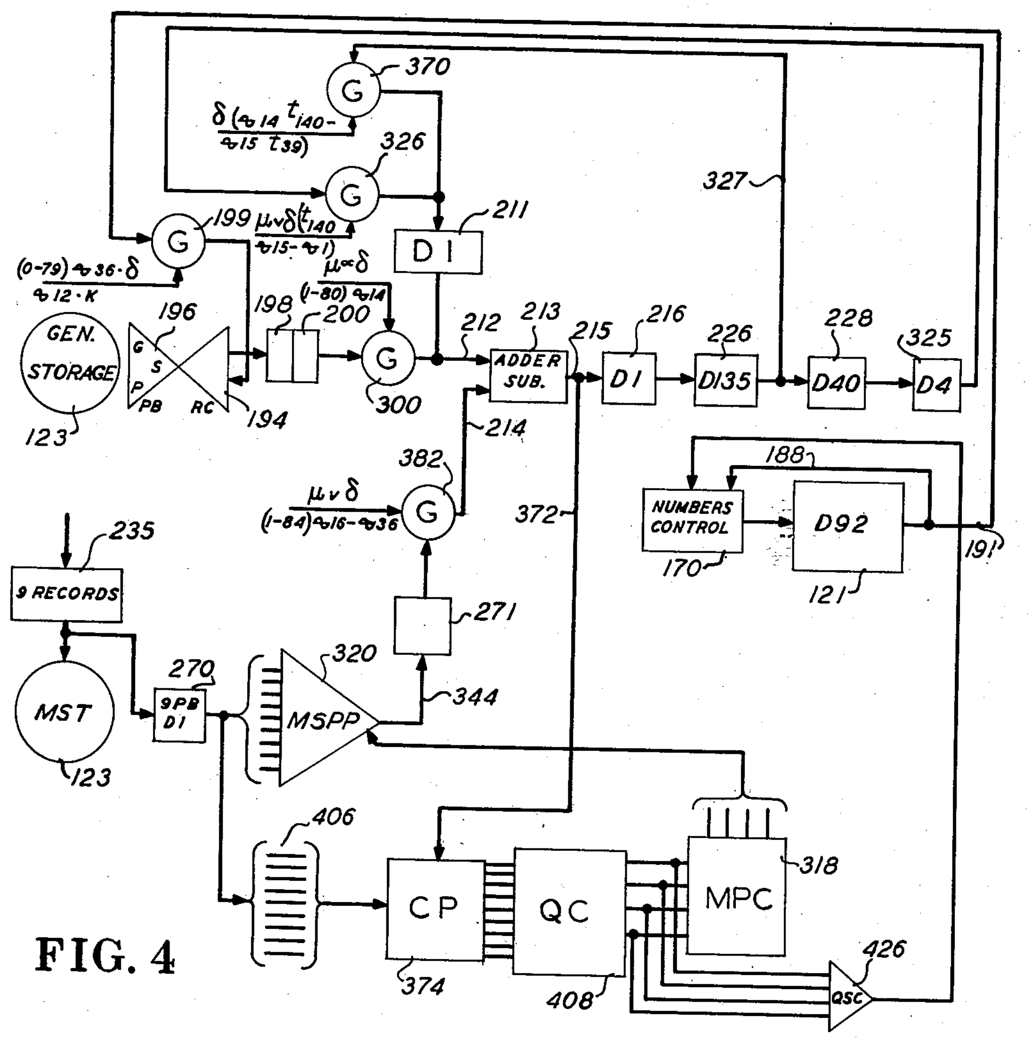
Fig. 4 is a block diagram of that portion of the means of the invention which is concerned with division.

During cycle 13 of multiplication and division operations, that portion of the order which relates to the number B of the operation (multiplier or dividend) is transmitted from intermediate orders storage device 122 through gate 203 to the general storage control unit 197 (Figs. 1 and 16). This unit is set up accordingly and in turn sets up the selection circuit 196 to permit playback of number B from general storage drum 123 during cycle 14. Referring to Figs. 1, 3, and 4, the played back signals are applied to a coincidence gate 300 which is opened during time periods $t_1$ to $t_{80}$ of cycle 14 of multiplication and division operations to pass the same. The output of gate 300 is applied to the terminal 212 of adder-subtracter 213 whose output is connected by the delay circuit 216 and a line 309 with the numbers control unit 170 to effect recording of the number B in the intermediate numbers storage unit 121. Referring to Fig. 6, which illustrates the numbers control unit 170, there is shown a coincidence gate 302 whose output is applied to the inverter 178 and to the gate 176 which, as described above, are operated selectively to effect recording in the intermediate numbers storage device. One input to gate 302 stems from a flip-flop 304 which is set to apply a high potential to the gate by a coincidence gate puller 306 and which is reset by an inverter puller 308. Puller 306 is operated at time period $t_5$ of each cycle of a multiplication operation. Puller 308 is operated at time period $t_{85}$ of every cycle. The other input of gate 302 stems from a plate connected type gate 310 to one input of which a signal indicative of cycle 14 is applied through an inverter 312. The second input of gate 310 has inverted signals indicative of the number B applied thereto over line 309. These signals may be obtained by utilizing an inverter at the output of delay unit 216, or, when the delay circuit is of flip-flop construction, by utilizing that output thereof which is the inversion of the input.

It is believed obvious, therefore, that the number B is played back from general storage during cycle 14 and if the operation is one of multiplication, the same is applied to numbers control unit 170 during time periods $t_5$ to $t_{84}$ of cycle 14 and is recorded in intermediate numbers storage device 121 during said time periods of that cycle. When the operation is one of division, the played back number B is handled differently as will appear hereinafter.

As mentioned above, the number B which is played back from general storage during cycle 14 is either a multiplier or a dividend. The manner in which the number is utilized depends upon which of the two the number is. The mode of operation which ensues if the number B is the multiplier and the means for carrying out the said mode of operation will be described first.

Referring now to Figs. 1 and 3, an inverted output (low=1, high=0) of intermediate numbers storage device 121 is applied over a line 316 to a multiples playback control unit 318 whose function it is to set up a multiples storage playback pyramid 320 and thus effect playing back of the appropriate multiple of the number A, that is, the multiplicand. In Fig. 6, the output 188, 191 of playback 186 which is high (0 volts) to indicate binary one is labeled I whereas output line 316 which is low (−20 volts) to indicate binary one is labeled I′. This notation is utilized in other figures of the drawing for the same purpose.

In order to facilitate an understanding of circuits 318 and 320 (Figs. 1 and 3), it is deemed desirable first to describe the manner in which the multiplier digits are transmitted to circuit 318 by intermediate numbers storage device 121. As described hereinabove, the twenty digits of the multiplier are recorded in the intermediate storage device, lowest order digit first and highest order digit last, during time periods $t_5$ to $t_{84}$ of cycle 14. Due to the precessing nature of said storage device, the said digits are re-recorded during time periods $t_{97}$ to $t_{176}$ of the same cycle and are played back to be recorded again during time periods $t_9$ to $t_{88}$ of cycle 15, etc. That digit of the multiplier which is played back during time periods $t_{85}$ to $t_{88}$ of cycle 15 is the highest order digit thereof and, as presently will appear, is the only one which affects circuit 318 during that cycle. During cycle 16 the next to the highest order digit of the multiplier is played back during time periods $t_{85}$ to $t_{88}$ and effects an operation of circuit 318. This mode of operation continues until on cycle 34 the lowest order digit of the multiplier is played back during time periods $t_{85}$ to $t_{88}$.

In multiples playback control circuit 318 (Fig. 9), line 316 is applied to a coincidence gate 332 which is opened during multiplication and division operations and whose output is applied through an inverter 334 to four coincidence gate pullers $336_1$, $336_2$, $336_4$ and $336_8$. The gates $336_1$, $336_2$, $336_4$ and $336_8$ are opened during time periods $t_{85}$, $t_{86}$, $t_{87}$ and $t_{88}$ respectively, so that only the digit signals transmitted from storage device 121 during those time periods are effective to control the multiples playback control circuit. The output of gate 332 assumes a low potential and the output of inverter 334 a high potential only when high signals indicative of binary zero are applied to the gate. Therefore, each gate puller $336_1$, $336_2$, $336_4$ or $336_8$ conducts only when a binary zero is transmitted from the storage device 121 during the appropriate time period $t_{85}$, $t_{86}$, $t_{87}$, or $t_{88}$. The gate pullers 336 are applied to flip-flops 338 which have been preset each to a state indicative of binary one, to reset the approprriate one or ones thereof to the opposite or zero indicating state.

The value represented by each flip-flop 338 in binary coded decimal notation is indicated by a subscript 1, 2, 4 or 8 applied to its reference character. The means for setting the flip-flops to indicate binary one comprises a coincidence gate 340 which conducts on application thereto of an A pulse during time period $t_{85}$. The A pulses, it will be remembered, are produced by generator 124 (Fig. 5) and occur near the beginning of each time period as shown in the pulse diagram of Fig. 8. The output of gate 340 is applied to an inverter 341 whose output in turn controls four inverter pullers 342. Each puller 342 is applied to one of the flip-flops 338 to set the latter to indicate binary one.

Evidently, therefore, the flip-flops 338 are set to indicate binary one at A pulse time of time period $t_{85}$, except, possibly, flip-flop $338_1$ in those instances wherein its gate $336_1$ is made conductive to reset the flip-flop at the beginning of time period $t_{85}$, it being remembered that playback circuit 186 of storage device 121 is also controlled by the A pulses. This condition is of no matter however, as gate $336_1$ remains conducting for the whole of time period $t_{85}$ and assumes complete control of flip-flop $338_1$ after the A pulse has passed. Later, during time periods $t_{86}$, $t_{87}$, and $t_{88}$, one or more of the flip-flops $338_2$, $338_4$, and $338_8$ may also be reset to indicate binary zero, depending on the digit transmitted from storage device 121.

Flip-flops $338_1$, $338_2$, $338_4$, and $338_8$ are provided, respectively, with output lines *d*, *c*, *b* and *a* which assume a high potential when the associated flip-flop is set to indicate binary one, and output lines *d'*, *c'*, *b'* and *a'* which assume a high potential when the associated flip-flop is reset to indicate binary zero.

The flip-flops 338, through their dual output lines, control the multiples storage playback pyramid 320 whose purpose it is to connect an output line 344 of the pyramid with the multiple playback circuit $m_1$–$m_9$ appropriate to the multiplier digit transmitted from storage device 121 and set up in flip-flops 338.

Pyramid 320 may be of any suitable sort which satisfies the logical equations $$PBm_1 \equiv c'.b'.d.a' \quad —$$
$$PBm_2 \equiv c.b'.d'.a' \quad —$$
$$PBm_3 \equiv c.b'.d.a' \quad —$$
$$PBm_4 \equiv c'.b.d'.a' \quad —$$
$$PBm_5 \equiv c'.b.d.a' \quad —$$
$$PBm_6 \equiv c.b.d'.a' \quad —$$
$$PBm_7 \equiv c.b.d.a' \quad —$$
$$PBm_8 \equiv d'.a \quad —$$
$$PBm_9 \equiv d.a \quad —$$

wherein the symbol "≡" indicates "if and only if," and the symbol "." indicates "and"; and wherein the alphabetic variable designations are assumed to represent high potentials (0 volts). For example, the first equation, if spelled out, reads: The ones multiple is played back from playback circuit $m_1$ if and only if the output lines $c'$ and $b'$ and $d$ and $a'$ of the triggers 338 are all at the high potential of 0 volts.

An extremely efficient way of combining coincidence gates to form the pyramid, however, is arrived at by combining said logical equations into one equation $$(1)\quad \text{High on line } 344 \equiv a'.b'.c'.d.m_1 V a'.b'.c.d'.m_2 V a'.b'.c.dm_3 V a'.b.c'.d'.m_4 V a'.b.c'.d.m_5 V a'.b.c.d'.m_6 V a'.b.c.d.m_7 V a.b'.c'.d'.m_8 V a.b'.c'.d.m_9$$

wherein the symbol "V" indicates "or" and the designations $m_1$, $m_2$, etc. represent high outputs from the multiples playback circuits $m_1$, $m_2$, etc.; and by reducing this equation to one which is particularly suited to pentode coincidence gates and which is free of the redundancies found in Equation 1.

Factoring Equation 1 algebraically we obtain $$(2)\quad a'.(b.c'.d.m_1 V b'.c.d'.m_2 V b'.c.d.m_3 V b.c'.d'.m_4 V b.c'.d.m_5 V b.c.d'.m_6 V b.c.d.m_7) V a.(d'.m_8 V d.m_9)$$

$$(3)\quad a'.[d.(b'.c'.m_1 V b'.c.m_3 V b.c'.m_5 V b.c.m_7) V d'.(b'.c.m_2 V b.c'.m_4 V b.c.m_6)] V a.(d'.m_8 V d.m_9)$$

$$(4)\quad a'.[d.(b'.(c.m_1 V c.m_3) V b.(c'.m_5 V c.m_7)) V d'.(b'.c.m_2 V b.(c'.m_4 V c.m_6)] V a.(d'.m_8 V d.m_9)$$

Now, to put the equation in proper form for pentode coincidence gates, use is made of the logical theorem that $a'/b'.a/c'$ is the equivalent of $a'.b V a.c$, the symbol "/" denoting the negation of "and," that is, $a'/b'$ denotes "not *a' and b'*." Equation 4 becomes $$(5)\quad a'/[d.(b'.(c'.m_1 V c.m_3) V b.(c'.m_5 V c.m_7) V d'.(b'.c.m_2 V b.(c'.m_4 V c.m_6)]'.a/(d'.m_8 V d.m_9)'$$

$$(6)\quad a'/[d/(b'.(c'.m_1 V c.m_3) V b.(c'.m_5 V c.m_7).d'/(b'.c.m_2 V b(c'.m_4 V c.m_6)].a/(d'.m_8 V d.m_9)'$$

and finally $$(7)\quad a'/\{d/[b'/(c'/m_1.c/m_3).b/(c'/m_5.c/m_7)].d'/[b'/(c/m_2).b/(c'/m_4.c/m_6)]\}.a/[d'/m_8.d/m_9]$$

In Equation 7 each "negation of and" symbol "/" represents a pentode coincidence gate to the grids of which the variables on either side of the symbol are applied, and each "and" symbol "." represents the connection of the plates of two pentode coincidence gates to the grid of another through a common voltage divider.

The circuit described by Equation 7 is the pyramid 320 of Fig. 9 which need not be described further except to state that the same connects output line 344 thereof only with that one of the multiples playback circuits $m_1$–$m_9$ appropriate to the setup of the flip-flops 338 and to describe an illustrative operation thereof. It is also to be mentioned that in Fig. 9 the actual connections from the flip-flops 338 and the playback circuits $m_1$–$m_9$ to the coincidence gates of the pyramid are shown only in a few illustrative instances, the remaining connections being indicated by arrows applied to the gates and appropriately labeled.

In order to illustrate the operation of pyramid 320, it will be assumed that the flip-flops $338_1$, $338_2$, and $338_4$ have been set to their binary one indicating positions to represent a decimal digit 7. In this case a coincidence gate 350 to which the signals from playback circuit $m_7$ are applied is conditioned for conduction by the output *c* from the flip-flop $338_2$ and is made conducting by positive signals emanating from the playback circuit. The output of gate 350 is combined with that of a gate 352 which is maintained cut off by the output *c'* of flip-flop $338_2$ and each time gate 350 conducts, it cuts off a gate 354 which is primed for conduction by the output *b* of the flip-flop $338_4$. A gate 356 whose output is connected with that of gate 354 is maintained non-conducting by the output *b'* of flip-flop $338_4$. Therefore, each time gate 354 is cut off, a gate 358 which is primed for conduction by output *d* of flip-flop $338_1$ becomes conducting. The output of gate 358 is applied to a gate 360 in common with that of a gate 362 which is maintained non-conducting by output *d'* of flip-flop $338_1$. Therefore, when gate 358 becomes conducting, it cuts off gate 360 which is primed for conduction by output *a'* of flip-flop $338_8$. The output of gate 360 is combined with that of a gate 364 which is maintained cut off by the output *a* of flip-flop $338_8$. Each time gate 360 is cut off, therefore, output line 344 assumes a high potential, the same as at the output of playback circuit $m_7$.

Output line 344 of pyramid 320 is applied (Fig. 1) to the flip-flop memory 271 which, as described above, is common to all of the multiples playback amplifiers and which at A pulse time of each time period assumes a state indicative of the signal recorded during the preceding time period of a previous cycle. The output of unit 271 is, in turn, applied to a coincidence gate 382 which is opened during time periods 1 to 84 of cycles 16 to 36 of multiplication operations. The output of gate 382 is applied to terminal 214 of adder-subtracter 213.

In order for each multiple which is transmitted to adder-subtracter 213 under control of a multiplier digit to become a partial product which can be added to the other partial products to produce the total product of the two numbers, A and B, the same must, in effect, be multiplied by the power of ten appropriate to the denominational position of the multiplier digit, that is, units, tens, hundreds, etc. This, of course, merely involves a relative shift of one columnar position between successive multiples prior to adding the same together. In the instant computer wherein a columnar position is represented by a group of four time periods and wherein the several multiples are applied to the adder-subtracter during the same groups of time periods of successive cycles, the relative shift in position between succeeding multiples is obtained by re-applying the first multiple, that is, the one appropriate to the highest order multiplier digit, to the adder-subtracter as a partial product on the same cycle as, but four time periods later than, the second multiple (that appropriate to the multiplier digit of the next lower order), and by applying the sum of these two to the adder-subtracter on the same cycle as, but four time periods later than, the third multiple, etc. In short, the sum of previous multiples is shifted one columnar position to the left prior to the addition thereto of each succeeding multiple. It will be understood, of course, that if the multiples are applied to the adder-subtracter in inverse order, that is, the one appropriate to the lowest order multiplier digit first, the re-application of the first partial product would occur four time periods earlier than the initial application of the second multiple, etc.

In order to achieve the outlined mode of operation, use is made of a D184 loop which includes the adder-subtracter, the delay units 216, 226, 228 and 211 of the D180 loop plus a four time period delay 325 (Figs. 1 and 3). The D184 loop includes a coincidence gate 326 that is open from $t_{140}$ of cycle 15 of multiplication and division operations until the computer completes the operations and stands on cycle 1. Therefore, that multiple of the multiplicand which is applied to terminal 214 of the adder-subtracter during time periods $t_1$ to $t_{84}$ of cycle 16 traverses the D184 loop and is applied to adder-subtracter terminal 212 during time periods $t_5$ to $t_{88}$ of cycle 17, to be added to the second multiple which is applied to terminal 214 during time periods $t_1$ to $t_{84}$ of that cycle. The sum of these two multiples or partial products, also traverses the D184 loop and is applied to terminal 212 of the added-subtracter during time periods $t_5$ to $t_{92}$ of cycle 18 to be added to the third multiple which is applied to terminal 214 during time periods $t_1$ to $t_{84}$ of that cycle. This mode of operation is continued until on cycle 35 the sum of the first nineteen multiples or partial products is applied to terminal 214 of the adder-subtracter during time periods $t_5$ to $t_{160}$ to be added to the multiple appropriate to the twentieth multiplier digit which is applied to terminal 212 during time periods $t_1$ to $t_{84}$ of that cycle. The sum of this last addition is the product of the two numbers A and B. It will be noted that the gate 326 in the D184 loop is closed on cycle 36 so that the product does not cycle back through the adder-subtracter.

The product obtained in the manner just above described contains forty digits, twenty on either side of the decimal point. The instant computer does not make use of all forty digits of the product but rather only the center twenty, that is, ten on either side of the decimal point. Care must be taken, therefore, in entering numbers to be multiplied into the computer to ensure that their products do not include more than ten digits on either side of the decimal point, except, of course, if product digits beyond the tenth place to the right of the decimal point are not desired or required, in which case, the dropping of such digits is not objectionable. In order to store the twenty center digits of the product for future use, the delay unit 226 of the D180 and D184 loops described above has an output line 327 which is applied to a gate 328 (Figs. 1 and 3) that is opened during time periods $t_0$ to $t_{79}$ of cycle 36 of multiplication operations and whose output is applied to the record circuit 194 for general storage drum 123. Remembering that delay unit 216 constitutes a one time period delay and unit 226 a one hundred thirty-five time period delay, the product which appears at the output of the adder-subtracter during time periods $t_4$ to $t_{163}$ of cycle 35 is applied to gate 328 during time periods $t_{140}$ to $t_{179}$ of cycle 35 and $t_0$ to $t_{119}$ of cycle 36. As gate 328 is opened only during time periods $t_0$ to $t_{79}$ of cycle 36, only the signals applied thereto at such times are passed and only the center twenty digits of the product are recorded on drum 123.

In order for the product to be stored in a selected channel of the drum, that portion of the current order assigned to address C (the channel in which the product is to be stored) is played back during time periods $t_0$ to $t_7$ of cycle 35 (Fig. 16) and is applied to control circuit 197 to set up channel selector 196 prior to the transmittal of the product to record circuit 194.

As described hereinabove, the computer is reset to cycle 1 following cycle 36. On cycle 1, that portion of the current order assigned to address D (the location of the next order) is played back during time periods $t_0$ to $t_7$ and control circuit 197 sets up selector 196 to effect playing back from the drum 123 of the next order for the computer. From this point on, the operation is the same as described above if it is to be one of multiplication, or, if it is one of division, as presently to be described.

When the operation of the computer is one of division rather than one of multiplication, the multiples which are formed during cycles 4 to 12 are multiples of the divisor, and the number B which is played back from general storage during cycle 14 is the dividend. According to the invention, the dividend is compared with each of the nine multiples of the divisor and the highest one of said multiples divisible thereinto is subtracted therefrom. The remainder is then shifted in time to effect a multiplication by ten and all nine multiples are compared therewith, etc. The means for carrying out this program are such that on each of successive cycles 15 to 34, the dividend or a remainder thereof has subtracted therefrom the appropriate one of the nine multiples of the divisor as determined during the preceding cycle, the new remainder is shifted in time to effect a multiplication by ten, and the shifted remainder is compared with all nine multiples of the divisor to determine which one thereof will be subtracted therefrom during the next following cycle.

When on cycle 14 the number B, the dividend, is played back from general storage, the same is applied via gate 300 to terminal 212 of adder-subtracter 213 (Figs. 1 and 4). Thence the number B traverses a D140 loop which includes the adder-subtracter, delay units 216, 226 and 211, line 327 and a coincidence gate 370 which is opened to permit use of the D140 loop from time period $t_{140}$ of cycle 14 to time period $t_{39}$ of cycle 15 of division operations. Evidently, the number B which is applied to terminal 212 during time periods $t_1$ to $t_{80}$ of cycle 14 is reapplied to the terminal 212 between time period $t_{141}$ of cycle 14 and time period $t_{40}$ of cycle 15. After traversing the D140 loop the dividend is delayed a further three time periods by the adder-subtracter 213 and is transmitted over a line 372 to comparison circuit 374 between time periods $t_{144}$ of cycle 14 and time period $t_{43}$ of cycle 15.

Referring to Fig. 10 wherein the comparison circuit 374 is illustrated, the same includes a pair of coincidence gates 376 and 378 to the former of which the information from line 372 is applied and to the latter of which the inverse of said information is applied. Here again, line 372 may include two conductors which stem from opposite outputs of a flip-flop embodied in the adder-subtracter or the same may include one conductor which is applied directly to the input of gate 376 and indirectly to the input of the gate 378 through an inverter. The outputs of gates 376 and 378 are applied respectively to plate connected type coincidence gates 380 and 382 whose other inputs have applied thereto an inversion of the A pulses shown on the chart of Fig. 8. Evidently, the gates 380 and 382 can produce high output potentials indicative of binary one and binary zero respectively only during A pulse time of each time period, at which times, it will be remembered, the information in the adder-subtracter is being advanced from stage to stage. In order that the gates 376 and 378, and therefore the gates 380 and 382, are controlled during each A pulse by the output of the adder-subtracter which existed just prior to the A pulse, an integrator or delay circuit 384 is connected in the appropriate input of each of the gates 376 and 378. The purpose of this arrangement will be described hereinafter.

The other input to each of the gates 376 and 378 stems from a plate connected type coincidence gate 386 to which the output of an inverter 388 and the output of a flip-flop 390 are applied. Inverter 388 is caused to conduct and, therefore, to apply a low potential to gate 386 during cycles 15 to 34 of division operations. Flip-flop 390 is set by a triode puller to apply a low potential to said gate at time period $t_1$ of each cycle and is not reset until the beginning of time period $t_{85}$. Therefore, gate 386 is cut off and delivers a high potential to the gates 376 and 378 throughout time periods $t_1$ to $t_{84}$ of cycles 15 to 34 of division operations. Gates 376 and 378, of course, conduct during such times only on the application thereto of the appropriate information signals. When gate 376 or gate 378 does conduct, however, it effects cutoff of the associated gate 380 or 382 which produces a high output potential at A pulse time. The outputs of gates 380 and 382 are applied to cathode followers 392 and 394, of which the former delivers a high potential on application of each binary one to the comparison circuit whereas the latter delivers a high potential only on application to the comparison circuit of a binary zero. The outputs of cathode followers 394 and 392 are applied each to nine coincidence gates 396 or 398 respectively. The gates 396 and 398 control means for comparing each of the nine multiples with the dividend or a remainder thereof. Before entering into a description of said means, however, it is deemed desirable first to discuss the principle of operation thereof as applied to division.

In order to determine each quotient digit in division, it is necessary to compare all nine multiples of the divisor with the dividend (in the case of the highest order quotient digit) or with ten times a remainder of the latter (for all other quotient digits). For example, if the fourth multiple of the divisor is less than or equal to ten times a remainder while the fifth multiple is larger than the same, then the quotient digit is four. This comparison of each of the nine multiples is accomplished by nine comparison circuits to each of which one particular multiple is applied along with the dividend or ten times a remainder thereof. Each comparison circuit may include a flip-flop which is reset if the dividend or ten times a remainder thereof is greater than or equal to the multiple and which is set otherwise. If two numbers $n_1$ and $n_2$ are compared digit by digit starting from the lowest order digits, the flip-flop being reset whenever a digit of $n_1$ is greater than the corresponding digit of $n_2$ and being set when a digit of $n_1$ is less than the corresponding digit of $n_2$, and on resetting or setting action being accomplished when corresponding digits of the two numbers are equal, then the state of the flip-flop following comparison of the highest order digits of the number is indicative of the relative sizes of the numbers $n_1$ and $n_2$. The flip-flop will be in the "reset" state if $n_1 > n_2$ and in the "set" state if $n_2 > n_1$. If the flip-flop is reset initially, however, and the two numbers are equal, it will remain reset so that a "reset" state of the flip-flop following the last comparison indicates that $n_1 \geqq n_2$ while the "set" state indicates $n_2 > n_1$. It is to be noted that this method of comparison gives priority to higher order digits and may be utilized with any system of notation wherein successive digits are given greater weights. For example, when the binary coded decimal notation (1, 2, 4, 8, 10, 20, 40, 80, etc.) is utilized, comparison is on a binary basis and the binary digits 1, 2, 4, 8, 10, etc. are compared successively in the order given.

Referring again to the comparison gates 396 and 398, which it will be remembered are controlled in part by the outputs of cathode followers 394 and 392 respectively, the second input to each gate 396 is the output of one of the multiples playback circuits $m_1$–$m_9$, while the second input to each of the gates 398 is the inverse of that which is applied to the associated gate 396. This inversion is readily accomplished by inverter triodes 400 located in the output lines of the multiples playback circuits $m_1$–$m_9$.

Each pair of gates 396 and 398 serves as pullers for a flip-flop 402. For convenience, each gate 396 may be considered as setting its flip-flop while each gate 398 may be considered as resetting the same. In addition to the reset pullers 398, each flip-flop is also provided with a triode puller 404 which is operated at a convenient time, say time period $t_0$. If desired, a suitably connected master puller may be provided for all of the flip-flops. The purpose of the pullers 404 is to assure that all of the flip-flops are in their reset state preparatory to each comparison. The flip-flops 402 which are designated $FF_1$, $FF_2$, . . ., $FF_9$ for convenience have the values 1, 2, 3, . . ., 9 appropriate to the multiples which are transmitted to the gate pullers therefor, and the outputs of each are conveniently labeled $K_1$ and $K_1'$, $K_2$ and $K_2'$, etc.

Referring to Figs. 1 and 4, the nine multiples playback amplifiers $m_1$–$m_9$ are connected directly to the flip-flop pullers in the comparison circuit by lines 406, so that all nine multiples are played back to the pullers coincidentally. It will be remembered that the multiples are recorded during time periods $t_0$–$t_{79}$ of each cycle and that (Fig. 8) signal peaks indicative of a played back multiples digit appear at the output of the playback amplifiers at A pulse time of time periods $t_1$–$t_{84}$ of each cycle. Therefore, the gate pullers 396 and 398 are conditioned for conduction selectively, in accordance with the values of the multiples, at A pulse time of each time period $t_1$–$t_{84}$. The dividend with which the multiples are first compared is transmitted from the Adder-subtracter to the gates 376 and 378 of the comparison circuit between time period $t_{144}$ of cycle 14 and time period $t_{43}$ of cycle 15 inclusive. Remembering that the signals from the Adder-subtracter commence on the occurrence of each A pulse and last until the next, and that the delay circuit 384 in the input of each gate 376 and 378 prevents application of each said signal to the gate until the A pulse which initiates the same has passed, the gates 376 and 378 are controlled by said signals between time period $t_{145}$ of cycle 14 and time period $t_{44}$ of cycle 15 inclusive. However, the other input to each gate 376 and 378 is high to permit conduction thereof only during time periods $t_1$–$t_{84}$ (flip-flop 390). Therefore, only the signals indicative of the eleven highest order digits of the dividend which enter the gates 376 and 378 during time periods $t_1$–$t_{44}$ of cycle 15 are effective to cause conduction thereof selectively. Flip-flop 390 and gate 386 serve to block dividend digits during other times and effectively produce zeros in all decimal orders other than the highest eleven. This, of course, does not adversely affect the calculation. Conduction of gate 376 or gate 378 permits gate 380 or 382 to produce a high output potential at A pulse time and thus, through the cathode follower 392 or 394, to apply operating potentials to the gates 396 or 398 coincidently with the application thereto of signals from the multiples playback amplifiers as described earlier.

Evidently, a gate 396 is made conductive to set its flip-flop 402 only when a high signal indicative of binary one is applied thereto by the appropriate multiples playback circuit simultaneously with the application of a high potential indicative of binary zero from the appropriate cathode follower 394. Further, the gates 398 are made conductive to reset their flip-flops only on simultaneous application thereto of a "0" signal from the associated multiples playback circuit and a "1" signal from the appropriate cathode follower 392. It is to be noted that neither gate conducts when the signals from the cathode followers 392 and 394 are of the same kind as the signals from the associated multiples playback circuit, that is, both "1" signals or both "0" signals. Remembering that the multiples are played back lowest order digit first, and also that the eleven digits from the adder-subtracter arrive lowest order digit first, it will be seen that following a comparison made during time periods $t_1$–$t_{84}$ the output of each flip-flop 402 indicates whether the multiple applied to that flip-flop is greater than the dividend or not. When the multiple is equal to or less than the latter, output $K_{1-9}$ of the flip-flop is low and the output $K_{1-9}'$ thereof is high. Obviously, the outputs are reversed when the multiple is greater than the said number.

In order to illustrate the operation of one of the flip-flops 402, it will be assumed that a three digit multiple 013 (0000–0001–0011 in binary coded decimal notation) is applied to the grates 396 and 398, and a three digit number 112 (0001–0001–0010 in binary coded decimal notation) is applied thereto from the adder-subtracter during time periods $t_1$–$t_{12}$. During time period $t_0$ flip-flop 402 is reset by puller 404. During time period $t_1$ high potentials are applied to both grids of gate 396 and the same conducts and sets the flip-flop. This is due to the fact that the multiples units order digit 3 contains a coded decimal 1, whereas the units order digit 2 of the number from the adder-subtracter does not. Both numbers contain a coded decimal digit 2 but this does not effect coincident application of high potentials to either gate 396 or 398 during time period $t_2$. During time periods $t_3$ and $t_4$ high and low potentials are applied to the grids of each gate due to the fact that both numbers contain the same binary digits, namely zeros, in the coded decimal 4 and 8 positions. During time periods $t_5$, $t_6$, $t_7$ and $t_8$ opposite signals are applied to the grids of each gate due to the fact that the tens order decimal digit of each of the numbers being considered is 1. However, during time period $t_9$, the first time period of the hundreds decimal order, a high potential is applied to gate 398 to indicate a zero coded decimal digit from the multiples playback unit, coincidentally with the application of a high potential indicative of a coded decimal 1 from the adder-subtracter. This effects conduction of gate 398 and the flip-flop is reset. During time periods $t_{10}$, $t_{11}$, and $t_{12}$ opposite signals are applied to the grids of each gate due to the fact that the coded decimal digit 0 is transmitted from both sources during the same. Therefore, the flip-flop remains in the reset state and the output K thereof is high while the output K′ is low. Since the number 112 is greater than the multiple 013, the circuit evidently performs as described above, namely, that the output K thereof is high when the multiple applied thereto is smaller than or equal to the number transmitted thereto from the adder-subtracter.

In short, the nine comparison flip-flops 402 indicate by the potential states of their output lines K and K′ which, if any, of the multiples of the divisor are divisible into the dividend or a remainder of the latter if the step under consideration is not the first one of a division operation. In order to determine the highest multiple divisible into the divisor or a remainder thereof, the output lines K and K′ of the flip-flops 402 are applied to a quotient control circuit 408 (Fig. 10) which comprises four lines having the binary coded decimal values 1, 2, 4, 8 and which, for convenience, are referred to as lines $b_1$, $b_2$, $b_4$ and $b_8$. Line $b_1$ has applied thereto the outputs of four coincidence gates 410, 412, 414, 416 and an inverter 418. Gate 410 has applied to the inputs thereof the output lines $K_1$ and $K_2'$ of the comparison circuit. Obviously, gate 410 conducts only when the multiple $m_1$ is smaller than the number with which it is being compared, and multiple $m_2$ is larger than said number, this being the condition which effects application of high potentials to lines $K_1$ and $K_2'$. Conduction of gate 410 produces a low potential on line $b_1$. In like manner gate 412 has lines $K_3$ and $K_4'$ applied thereto, gate 414 has lines $K_5$ and $K_6'$ applied to it, and gate 416 has lines $K_7$ and $K_8'$ applied thereto. Inverter 418 has line $K_9$ applied thereto.

The construction is such that if the first, third, fifth, seventh or ninth multiple is the highest one divisible into the number with which it is compared, one of the gates 410, 412, 414 or 416 or the inverter 418 conducts, and line $b_1$ assumes a low potential. It is to be noted that line $b_1$ assumes the low potential only when the highest divisible multiple is an odd numbered one. Therefore, said line $b_1$, when it assumes a low potential, represents the value of 1 in the binary coded decimal notation, wherein all of the odd decimal digits are represented by at 1 plus whichever of the digits 2, 4 or 8 are required.

In the binary coded decimal notation only the decimal digits 2, 3, 6 and 7 include a binary 2. Line $b_2$ of quotient control circuit 408 has the coded decimal value of 2 and the outputs of two gates 420 and 422 are applied thereto. Gate 420 has the output $K_6$ of the comparison circuit applied to one grid and the output $K_8'$ applied to the other. Evidently, this gate will conduct and apply a low potential to line $b_2$ if the highest divisible multiple is the 6th one or the 7th one. Gate 422 has line $K_2$ applied to one grid and line $K_4'$ applied to the other and conducts when the second multiple is the highest divisible one and also when the third multiple is the highest divisible one. With regard to gates 420 and 422, it is believed evident that if the third multiple is divisible into the number with which it is compared, then the second multiple must also be so divisible and its output line $K_2$ will evidence this; and if the 7th multiple is divisible into the number with which it is compared, the 6th multiple must also be so divisible and output line $K_6$ will assume a high potential.

In the binary coded decimal notation the binary digit 4 is used in combination with the binary digits 1 and 2 to represent the decimal digits 4, 5, 6 and 7. Line $b_4$ of quotient control circuit 408 which has the coded decimal value of 4 stems from a coincidence gate 424, having output line $K_4$ of the comparison circuit applied to one grid and output line $K_8'$ applied to the other. Gate 424 conducts whenever the 4th, 5th, 6th or 7th multiple is the highest one divisible into the number with which it is compared, and each time the gate conducts line $b_4$ assumes a low potential representing 4.

Line $b_8$ of the quotient control circuit stems directly from output line $K_8'$ of comparison circuit 374 and assumes a low potential whenever the 8th or 9th multiple is the highest one divisible into the number with which it is compared.

Lines $b_1$, $b_2$, $b_4$ and $b_8$ of the quotient control circuit, which assume low potentials selectively to indicate in binary coded decimal notation which of the nine multiples is the highest one divisible into the dividend or a remainder thereof, are connected to the multiples playback control circuit 318. Lines $b_1$, $b_2$ and $b_4$ are also connected to a quotient serial converter 426 along with output line $K_8$ of flip-flop $402_8$ (Figs. 4, 1 and 10). The purpose of connecting said lines to the multiples playback control circuit 318 is to effect the playback of the appropriate multiple of the divisor into the adder-subtracter wherein the same is subtracted from the dividend or a remainder thereof to form a new remainder which can be compared with the multiples as just before described. The purpose of the quotient serial converter 426 is to convert the potentials assumed by the four lines $b_1$, $b_2$, $b_4$ and $b_8$ into serially coded signals which can be transmitted over a single line 438 to the numbers control circuit 170.

It is deemed desirable to describe the quotient serial converter circuit prior to entering into a description of the manner in which the lines $b_1$, $b_2$, $b_4$ and $b_8$ control the multiples playback control circuit 318. Referring to Fig. 10, the lines $b_1$, $b_2$ and $b_4$ are connected through inverters 429 to the inputs of coincidence gates 430, 432 and 434 respectively. Line $K_8$ which, it will be noted, is the inverse of line $b_8$ is applied directly to a gate 436. Also applied to said gates are timing signals which condition gate 430 for conduction during time period $t_{88}$, gate 432 for conduction during time period $t_{89}$, gate 434 for conduction during time period $t_{90}$ and gate 436 for conduction during time period $t_{91}$. The several gates are provided with a common output line which is connected through an inverter 439 with a line 438 which assumes a high potential only when one of the gates conducts. It is to be noted that each gate can conduct only during one of the four time periods and then only when the associated line $b_1$, $b_2$, $b_4$ or $b_8$ is at a low potential which indicates that the same is required in the binary coded decimal representation of the decimal quotient digit. Again, it is to be noted that line $K_8$ which is applied to gate 436 is high only when line $b_8$ is low. During time periods $t_{88}$–$t_{91}$, therefore, line 438 assumes a high potential to indicate binary ones in the four coded decimal positions, and a low potential to represent zeros in said positions. Referring now to Fig. 6 wherein the numbers control unit 170 is illustrated, line 438 is applied to a coincidence gate 440 which is conditioned for conduction by a flip-flop 442. Flip-flop 442 is set to perform the desired function by a coincidence gate puller 444 which is made conductive on cycle 15 of a division operation. The flip-flop is reset to prevent conduction of gate 440 by an inverter puller 446 which is made conductive on cycle 35. The output of gate 440 is applied to the inverter 178 and gate 176 which, it will be remembered, control recording of information in intermediate storage unit 121. It is to be mentioned that the inverters 429 and 439 may be eliminated if the lines $b_1$, $b_2$, $b_4$ and $b_8$ are rearranged to assume high potentials to represent binary one.

The construction is such that when on cycles 15 through 34 the several multiples of a divisor are compared with the dividend and remainders thereof, the lines $b_1$, $b_2$, $b_4$ and $b_8$ assume high or low potentials selectively to indicate in coded decimal notation the highest multiple divisible into the divisor and each remainder, this representation being a quotient digit which through the medium of the parallel to serial conversion performed by gates 432, 434 and 436 is recorded in the intermediate numbers storage device 121. It will be remembered that information recorded in said storage unit is precessed one digit space per cycle which results in that each quotient digit after having been recorded during time periods $t_{88}$–$t_{91}$ of a particular cycle is precessed until all 20 of the quotient digits are recorded in said unit during time periods $t_{88}$–$t_{167}$ of cycle 34.

Referring now to the manner in which the output lines $b_1$, $b_2$, $b_4$ and $b_8$ of quotient control circuit 408 (Fig. 10) effect the multiples playback control circuit 318 (Fig. 9), each of said lines is applied to a coincidence gate 448 which serves as a puller for the appropriate one of the flip-flops $338_1$, $338_2$, $338_4$, and $338_8$ described above. For convenience, the gates 448 are also given the subscripts 1, 2, 4 and 8. The other input of each of the gates 448 stems from an inverter 450 which is controlled by a coincidence gate 452 that is made conductive to cut off inverter 450 at time period $t_{86}$ of each cycle of a division operation. Each time inverter 450 is cut off it conditions the gates 448 for conduction. Remembering that the lines $b_1$, $b_2$, $b_4$ and $b_8$ assume low potentials to indicate the quotient digit in binary coded decimal form, and also that all of the flip-flops 338 are set to their binary one indicating conditions at time period $t_{85}$, the flip-flops 338 associated with lines $b_1$, $b_2$, $b_4$ and $b_8$ having high potentials are reset to their zero indicating conditions during time period $t_{86}$. Therefore, the output lines of the flip-flops 338 assume the potentials appropriate to set up pyramid 320 in the proper manner to effect playback of the desired multiple from multiples storage. The played back multiple is transmitted over output line 344 of the pyramid to the adder-subtracter (Figs. 1 and 4), the same as described above in connection with multiplication. However, during division operations the adder-subtracter is arranged to perform subtraction rather than addition after the multiples have been formed. Any known means to this end may be utilized, for example, means gated to effect subtraction during cycles 15–34 of division operations. As the same forms no part of the invention a description thereof will not be given.

It is thought that the most advantageous way of illustrating the operation of the computer in the performance of division is to describe an actual sample division.

Referring to Fig. 17, there is illustrated the several steps involved in the division of a number 0000068246.2248608000 by the number 0000022446.842800000

The dividend, that is, the first number recited will be referred to as number A. The second number, the divisor, will be referred to as number B. During cycles 4 through 12 of the division operation, the nine multiples of the divisor B are generated and stored in the multiples storage channels in the same manner as described above in connection with multiplication. On cycle 13 that portion of the order contained in the intermediate orders storage device which pertains to the address of the dividend A is transmitted to general storage control unit 197 to effect playback of the dividend during cycle 14. The played back dividend is transmitted through the adder-subtracter and the D140 loop and back to the adder-subtracter again to the comparison circuit. Inasmuch as the dividend is played back during time periods $t_1$–$t_{80}$ of cycle 14 and passes through delays totaling 144 time periods prior to its application to the comparison circuit, the same is applied to the latter between time period $t_{145}$ of cycle 14 and time period $t_{81}$ of cycle 15. It is to be noted that the eleven highest order digits of the dividend are applied to the comparison circuit during time periods $t_1$–$t_{44}$ of cycle 15, whereas the nine lower order digits thereof are applied earlier during cycle 14. Meanwhile, during time periods $t_1$–$t_{81}$ the nine multiples of the divisor A are also applied to the comparison circuit. Obviously (in the example), a comparison between the eleven highest order digits of the dividend and the entirety of each of the multiples discloses that all of the multiples are greater than that portion of the dividend with which they are compared. This is shown on the top two lines of Fig. 17 wherein the "ones," or first multiple of the divisor, is associated with the dividend. All of the multiples being greater than the portion of the dividend with which they are compared, high potentials are applied to all of the lines $b_1$, $b_2$, $b_4$ and $b_8$ of quotient control circuit 408. This condition, in turn, maintains the gates 430, 432, 434 and 436 cutoff during successive time periods $t_{88}$, $t_{89}$, $t_{90}$ and $t_{91}$ of cycle 15 and a zero is recorded in the intermediate numbers storage device. This is the highest order quotient digit. At the same time the high potentials on the lines $b_1$, $b_2$, $b_4$ and $b_8$ effect resetting of the four flip-flops 338 to their zero indicating condition at time period $t_{86}$ of cycle 15. Therefore, when on cycle 16 the nine multiples are played back, none of them are transmitted through pyramid 320 to the adder-subtracter.

At the same time that the dividend is applied to comparison circuit 374, namely time period $t_{145}$ of cycle 14 to time period $t_{44}$ of cycle 15, the same begins a traverse of the D184 loop described above. This effects a reapplication of the dividend to the comparison circuit between time period $t_{149}$ of cycle 15 and time period $t_{48}$ of cycle 16, that is, shifted one digit space to effect a multiplication by ten. It will be understood, of course, that what is reapplied to the comparison circuit is not actually the dividend but rather ten times the first remainder thereof, zero having been subtracted from it in the adder-subtracter prior to the one digit space shift. During cycle 16 the twelve highest order digits of the first remainder of the dividend are compared with all nine multiples of the divisor and again it is found that the "ones" or first multiple is greater than the number with which it is compared.

It is believed evident, therefore, that the mode of operation on each cycle in a division operation is to subtract from the dividend or a remainder thereof that multiple of the divisor which, during the preceding cycle, was found to be the highest one divisible thereinto, to shift the new remainder one digit space (to effect a multiplication by ten) and to compare the shifted new remainder with all nine multiples of the divisor.

It is not believed necessary to go through each and every step of the sample division problem illustrated in Fig. 17. However, it is thought desirable to describe one further step wherein one of the multiples is subtracted from a remainder. For example, on cycle 24 the shifted remainder is entirely contained within the comparison period, i. e., time periods $t_1$–$t_{80}$, and the comparison thereof with the nine multiples of the divisor discloses that the "threes" or third multiple is the highest one divisible thereinto. Accordingly, on cycle 24 signals indicative of the decimal digit 3 are transmitted to the intermediate numbers storage device and are recorded therein. The shifted remainder which was used for comparison during cycle 24 is applied to the adder-subtracter D3 during time periods $t_1$–$t_{80}$ of cycle 25 coincidentally with the application to the adder-subtracter of the third multiple of the divisor. In the adder-subtractor the latter is subtracted from the former and the new shifted remainder is applied to the comparison circuit during time periods $t_5$–$t_{84}$ of cycle 25. It is to be noted that the several shifts of the remainder which occurred during cycles 16—25 resulted, finally, on cycle 25, in the generation of a zero during time periods $t_1$–$t_4$. Referring to Fig. 17, it will be seen that on each later cycle, another zero is added to the righthand end of the leftwardly shifting remainders. Of course, these zeros are formed automatically, being the product of applicant's comparison circuit "remainder" gates 376 and 378 which produce zero signals unless otherwise controlled.

Hereinafter, when speaking of the comparison of a multiple with an appropriately, relatively located dividend, it will be convenient to state that the multiple is compared with a predetermined portion of the dividend. In this regard it is to be noted that the multiple may be recorded with all of an appropriately shifted multiple or with all of the digits to the left of the decimal point thereof plus one or more of the digits to the right of the decimal point, the dividend, of course, always being appropriately shifted relative to the multiples.

As indicated in Fig. 17, the twentieth or last comparison is made on cycle 34 and the lowest order digit of the quotient is transmitted to the intermediate storage device. On cycle 34 this lowest order quotient digit, and, of course, the other nineteen digits are recorded during time periods $t_{88}$ to $t_{167}$. It is to be noted that, as indicated in Fig. 17, a twenty-first comparison may be made on cycle 35 for the purpose of obtaining a round off digit. According to the invention, any desired means may be controlled by the twenty-first comparison, for example, means for recording the round off digit or means for initiating another division operation in which the remainder utilized in the twenty-first comparison is the dividend. However, such means form no part of the invention and need not be described.

Referring to Fig. 6, recording on disc 183A of the intermediate storage device and, therefore, precession are halted at the beginning of cycle 35 at which time gate 179 is made conducting. Therefore, the quotient recorded during time periods $t_{88}$ to $t_{167}$ of cycle 34 is played back during time periods $t_0$ to $t_{79}$ of cycle 35 and again during those same time periods of cycle 36. The output of the memory section 186 of the playback circuit associated with disc 183A is applied (Figs. 1 and 4) to the gate 199 described above and which is open during time periods $t_0$ to $t_{79}$ of cycle 36 of division operations. Evidently, the quotient is recorded on drum 123 during that time.

In order that the quotient is recorded in the appropriate channel, that portion of the order which is played back during $t_0$ to $t_7$ of cycle 35 sets up the channel selection circuit 196 the same as described above in connection with the product of a multiplication.

There have been described, therefore, means for performing multiplication and division in accordance with the nine multiples comparison methods.

It is to be mentioned that whereas in the present instance the results of computations are shown as being recorded in a selected channel of the storage drum, the same may be transmitted to any desired type of indicating unit, such, for example, as an electric typewriter or the like.

It is also to be mentioned that the timing utilized in the described embodiment of the invention is only by way of example and that the actual times at which the several units function may be modified to fit the requirements of individual uses; for example, as here shown, the computer handles 20-digit numbers and various gating circuits are set to open during time periods $t_0$ to $t_{79}$ to pass signals indicative of the numbers. If the computer were to handle 10-digit numbers, the timing might be changed to $t_0$ to $t_{39}$.

While there has been above described but one embodiment of the invention, it is to be understood that many changes and modifications may be made therein without departing from the spirit of the invention and it is not desired, therefore, to limit the scope of the invention except as pointed out in the appended claims or as indicated by the prior art.

I claim:

1. In a cyclically operable computer wherein numbers embodying one or more digits are represented by electric signals, the combination of a source of representations of numbers to be used in computations, a precessing storage unit wherein a number representation is precessed one digit representation time per cycle, an adder-subtracter wherein the nine multiples of a multiplicand or divisor whose representation is applied thereto are formed by adding the same to itself and its sums on nine successive cycles, means for so operating the adder-subtracter, a multichannel storage unit wherein representations of the multiples are stored, means for transmitting a multiplier representation to the precessing unit, a selector circuit controlled by multiplier digit representations for selecting the channel of the multiples storage unit appropriate to the value of a multipler digit on each of a plurality of successive cycles, means for applying the multiples representations in selected channels to the adder-subtracter on successive cycles for addition of one multiple to another to form a product, means for shifting the representations of the first multiple so applied and the representations of the sums of it and other multiples one digit representation time per cycle to align the same for appropriate addition to the next multiple whose representation is transmitted to the adder-subtracter, means for transmitting a representation of the product formed in the adder-subtracter to the number source, means for transmitting a dividend representation from the number source to the adder-subtracter, circuit means for comparing a predetermined portion of the dividend representation with the representations of said nine multiples of the divisor, said comparison means controlling said selection circuit in accordance with the highest multiple divisible into the dividend to effect transmittal of the representation of said multiple to the adder-subtracter for subtraction of that multiple from the dividend, means for shifting the representation of the remainder produced by said subtraction effectively, one digit representation time for application to the comparison circuit for comparison with the representations of the nine multiples, means for recording in the precessing unit representations of the quotient digits appropriate to the results of the comparisons, and means for transmitting assembled quotient representations to said number source.

2. In a cyclically operable computer wherein numbers are represented by electric signals, the combination of a source of representations of numbers to be used in computations, an adder-subtracter wherein the nine multiples of a multiplicand or divisor whose representation is applied thereto are formed by adding the same to itself and its sums on nine successive cycles, means for so operating the adder-subtracter, a multichannel storage unit wherein representations of the multiples are stored, a selector circuit for selecting the channel of the multiples storage unit appropriate to the value of a multiplier digit on each of a plurality of successive cycles, means for controlling said selector circuit differentially in accordance with the values of the several digits of a multiplier, means for applying the multiples representations in selected channels to the adder-subtracter on successive cycles for addition of one multiple to another to form a product, means for shifting the representations of the first multiple so applied and the representations of the sums of it and other multiples one digit representation time per cycle to align the same for appropriate addition to the next multiple whose representation is transmitted to the adder-subtracter, means for transmitting a dividend representation from the number source to the adder-subtracter, circuit means for comparing a predetermined portion of the dividend representation with the representations of the nine multiples of the divisor, said comparison means controlling said selection circuit in accordance with the value of the highest multiple divisible into the dividend of effect transmittal of the representation of said multiple to the adder-subtracter for subtraction of that multiple from the dividend, means for shifting the representation of the remainder produced by said subtraction effectively one digit representation time for comparison with the representations of the nine multiples, and means for recording representations of the quotient digits appropriate to the results of the comparisons.

3. In a cyclically operable computer wherein numbers are represented by electric signals and the nine multiples of a multiplicand or divisor are formed by adding the same to itself and its sums, and wherein multiplication is accomplished by relatively shifting and adding the appropriate multiples together and wherein division is accomplished by relatively shifting and subtracting the appropriate multiples from the dividend and its remainders, the combination of an adder-subtracter for operating on two factors applied thereto simultaneously in the form of signals, a one cycle delay loop for applying the output of the adder-subtracter to the latter one full cycle after the factors resulting in said output are applied thereto, a second delay loop for reapplying the output of the adder-subtracter to the latter one cycle later than the factors which produced said output but shifted one digit time, a general storage device from which the factors in a computation are extracted in the form of signals, one factor on each of predetermined cycles, a precessing storage unit, timely operable means for extracting a multiplier from general storage and entering it into the precessing unit, for extracting a dividend from general storage and applying it to the adder-subtracter wherein the appropriate multiples are subtracted therefrom and for extracting a multiplicand or divisor from general storage and applying it to the adder-subtracter wherein the nine multiples thereof are formed, a multi-channel multiples storage unit wherein representations of the multiples are stored, one per channel, means for extracting the multiples from storage in the form of signals and applying them to the adder-subtracter, one per cycle, including a selection circuit to select the channel from which the multiple is to be extracted on each cycle, a control unit for said selection circuit, means for extracting a digit of the multiplier from the precessing unit in the form of signals on each of a plurality of cycles and applying it to the control unit to effect extraction from storage of the multiple appropriate to the value of the digit, a comparison circuit for comparing the nine multiples of the divisor with a predetermined portion of the dividend or a remainder thereof, a control circuit operated by the comparison circuit to cause the said control unit to effect extraction fro mstorage through said selection circuit of the highest multiple divisible into the dividend or a remainder thereof, and a coding circuit controlled by said control circuit to effect recording in the precessing unit of a representation of the quotient digit appropriate to the value of the highest multiple divisible into the dividend or its remainder.

4. The combination according to claim 3 wherein the number-representing signals comprise a series of pulses to indicate binary one and binary zero and wherein said comparison circuit comprises a plurality of flip-flops, one for each multiple of the divisor, a puller for each flip-flop to set the same in a predetermined state prior to each comparison, a first coincidence gate puller for setting each flip-flop in the opposite state on simultaneous application thereto of pulses indicative of a binary one in a said multiple and a binary zero in the dividend or a remainder thereof, a second coincidence gate puller for seting each flip-flop to said predetermined state on simultaneous application thereto of pulses indicative of a binary zero in a said multiple and a binary one in the dividend or a remainder thereof, and means for inverting the dividend or remainder and the multiples pulses as applied to the first and second coincidence pullers respectively.

5. The combination according to claim 4 wherein said control circuit includes a plurality of lines which assume alternate potential states and which in combination indicate, in code, the highest divisible multiple and a plurality of coincidence gates differentially controlled by said flip-flops to determine the potentials of all save one of said lines, said one line being controlled directly by the flip-flop associated with the eights multiples.

6. The combination according to claim 5 wherein the control unit includes a plurality of flip-flops controlling the selection circuit, one of each line of said control circuit and each set to one state on assumption of the appropriate potential by a said line, pullers for so setting said flip-flops, and pullers for resetting the flip-flops prior to each operation of said lines to set the same.

7. The combination according to claim 6 wherein the control unit also includes coincidence gate pullers for setting the control flip-flops, and timed means for successively conditioning the last said pullers for selective operation by the pulses representing the multiplier digit extracted on each cycle.

8. The combination according to claim 7 wherein the coding circuit includes a single line, a plurality of coincidence gates for applying alternative potentials to said line, one for each line of said control circuit and each conditioned for conduction or cutoff thereby, and timed means for effecting conduction of appropriately conditioned gates successively.

9. The combination according to claim 8 and including means for recording representations of multiples in each of said channels, coincidence gates controlling operation of the recording means for each channel, all of the multiples being applied to all of the gates, and timed means for conditioning said gates for conduction during a plurality of successive cycles, one channel gate per cycle.

10. The combination according to claim 9 and including means for displacing the dividend signals in time relative to those for said multiples prior to application thereof to the comparison circuit an amount appropriate to effect comparison of the entirety of each multiple with the highest order fractional decimal digit and all of the whole digits of the dividend.

11. The combination according to claim 3 and including means for displacing the dividend signals in time relative to those for said multiples prior to application thereof to the comparison circuit an amount appropriate to effect comparison of the entirety of each multiple with the whole digits and at least the highest order fractional decimal digit of the dividend.

12. In a cyclically operable computer wherein numbers are represented by electric signals, the combination of a source of representations of numbers to be used in computations, a precessing storage unit wherein a number representation is precessed one digit representation time per cycle, an adder-subtracter wherein the nine multiples of a divisor whose representation is applied thereto are formed by adding the same to itself and its sums on nine successive cycles, means for so operating the adder-subtracter, a multichannel storage unit wherein representations of the multiples are stored, a selector circuit for selecting the channel of the multiples storage unit from which a multiple representation is to be transmitted on each of a plurality of successive cycles, means for transmitting the representations of the selected multiples to the adder-subtracter, means for transmitting the representation of a dividend from the number source to the adder-subtracter, circuit means for comparing a predetermined portion of the dividend representation with the representations of the nine multiples of the divisor, said comparison means controlling said selection circuit in accordance with the value of the highest multiple divisible into the dividend to effect transmittal of the representation of said multiple to the adder-subtracter for substraction of that multiple from the dividend, means for shifting the representation of the remainder produced by said subtraction effectively one digit representation time for comparison with the representations of the nine multiples, means for recording in the precessing unit representations of the quotient digits appropriate to the results of the comparisons, and means for transmitting the representation of an assembled quotient to said number source.

13. In a cyclically operable computer wherein numbers are represented by electric signals, the combination of a multi-channel general storage medium, an adder-subtracter, means for extracting a representation of a divisor from the general storage medium and applying it to the adder-subtracter on each of nine successive cycles, said means, on a later cycle, also extracting a representation of a dividend from the general storage medium and applying it to the adder-subtracter, a multichannel storage device wherein representations of the nine multiples of the divisor are stored, means for applying the output of the adder-subtracter to an input thereof on the last eight of said nine successive cycles for addition of said outputs to the divisor which is transmitted from general storage, means for applying the output of the adder-subtracter on each of said nine cycles to a channel of the multiples storage device, means for extracting the multiples representations from storage, one per cycle, and applying them to the adder-subtracter for subtraction of the multiples from the dividend and the remainders of the latter, means for applying the outputs of the adder-subtracter to an input thereof to effect subtraction of the multiples therefrom, said means effectively shifting the said outputs one digit time relative to the multiples, a selection circuit interposed between the multiples extracting means and the multiples storage device and operable differentially to select which of the multiples is to be extracted from the latter on each cycle, a control circuit for effecting differential operations of said selection circuit in accordance with the value of the highest multiple divisible into the dividend or a remainder thereof, and a comparison circuit for comparing a predetermined portion of the dividend and the remainders thereof with the nine multiples of the divisor, said comparison circuit controlling said control circuit.

14. The combination according to claim 13 wherein the number representing signals comprise a series of pulses of opposite polarity to indicate binary one and binary zero and wherein said comparison circuit comprises a plurality of flip-flops, one for each multiple of the divisor, a puller for each flip-flop to set the same in a predetermined state prior to each comparison, a first coincidence gate puller for setting each flip-flop in the opposite state on simultaneous application thereto of pulses indicative of a binary one in a said multiple and a binary zero in the dividend or a remainder thereof, a second coincidence gate puller for setting each flip-flop to said predetermined state on simultaneous application thereto of pulses indicative of a binary zero in a said multiple and a binary one in the dividend or a remainder thereof, and means for inverting the dividend or remainder and the multiples pulses as applied to the first and second coincidence gate pullers respectively.

15. The combination according to claim 14 wherein said control circuit includes a plurality of lines which assume alternate potential states and which in combination indicate, in code, the highest divisible multiple and a plurality of coincidence gates differentially controlled by said flip-flops to determine the potentials of all save one of said lines, said one line being controlled directly by the flip-flop associated with the eights multiple.

16. The combination according to claim 15 and including a plurality of flip-flops controlling said selection circuit, one for each line of said control circuit and each set to one state on assumption of the appropriate potential by a said line, and pullers for resetting the flip-flops prior to each operation of said lines to set the same.

17. The combination according to claim 16 and including a precessing storage unit, means for recording in the precession unit representations of the quotient digits appropriate to the results of said comparisons, said means comprising a single line, a plurality of coincidence gates for applying alternative potentials to said line, one gate for each line of the control circuit and each conditioned for conduction or cutoff thereby, and timed means for effecting conduction of appropriately conditioned gates successively.

18. In a cyclically operable computer for performing division in accordance with the nine multiples comparison method and wherein numbers are represented by electric signals comprising a series of pulses to indicate binary one and zero, the combination of a comparison circuit operable on each of a plurality of successive cycles to compare a predetermined portion of the representation of a dividend or a remainder thereof with the representations of all nine multiples of a divisor, said comparison circuit comprising a plurality of flip-flops, one for each multiple of the divisor, a puller for each flip-flop to set the same in a predetermined state prior to each comparsion, a first coincidence gate puller for setting each flip-flop in the opposite state on simultaneous application thereto of pulses indicative of a binary one in a said multiple and a binary zero in the dividend or a remainder thereof, a second coincidence gate puller for setting each flip-flop to said predetermined state on simultaneous application thereto of pulses indicative of a binary zero in a said multiple and a binary one in the dividend or a remainder thereof, and means for inverting the dividend or remainder pulses and the multiples pulses as applied to the first and second coincidence gate pullers respectively, a control circuit set up by the comparison circuit to represent the value of the highest multiple divisible into the dividend or its remainder on each cycle, an adder-subtracter wherein on each of a plurality of successive cycles the said highest divisible multiple as determined during the preceding cycle is subtracted from the dividend or its remainder, means for applying the dividend representation to the adder-subtracter means controlled by said control circuit for delivering representations of the appropriate multiples to the adder-subtracter, means for applying representations of the new remainders resulting from said subtractions to the comparison circuit each shifted one digit time relative to the preceding one and to the multiples representations with which it is to be compared and means for applying each said new remainder to the adder-subtracter on the next cycle for subtraction of a multiple therefrom, but shifted one digit time relative to the latter.

19. The combination according to claim 18 wherein said control circuit includes a plurality of lines which assume alternate potential states and which in combination represent, in code, the highest divisible multiple and a plurality of concidence gates differentially controlled by said flip-flops to determine the potentials of all save one of said lines, said one line being controlled directly by the flip-flop associated with the eights multiple.

20. The combination according to claim 19 wherein said means controlled by the control circuit includes a multichannel storage device for said multiples, one multiple representation being stored in each channel, a selection circuit for connecting a selected channel with the adder-subtracter, a plurality of flip-flops controlling said selection circuit, one for each line of said control circuit and each set to one state on assumption of the appropriate potential by a said line, and pullers for resetting the flip-flops prior to each operation of said lines to set the same.

21. The combination according to claim 20 and including means for displacing the dividend representation in time relative to the representations of said multiples prior to application thereof to the comparison circuit an amount appropriate to effect comparison of the entirety of each multiple with the whole digits and at least the highest order fractional decimal digit of the dividend.

22. The combination according to claim 21 wherein said displacing means comprises time delay circuits, and including timed gating means blocking application of the representations of lower order fractional decimal digits of the dividend to the comparison circuit.

23. The combination according to claim 18 and including time delay circuits for displacing the dividend in time relative to the said multiples prior to application thereof to the comparison circuit and including timed gating means blocking application of the representations of the lower order fractional decimal digits of the dividend to the comparison circuit.

24. In a cyclically operable computer wherein numbers are represented by electric signals, the combination of a source of representations of numbers to be used in computations, a precessing storage unit wherein a number representation is precessed one digit representation time per cycle, an adder-subtracter wherein the nine multiples of a multiplicand are formed by adding the same to itself and its sums on nine successive cycles, means for so operating the adder-subtracter, a multichannel storage unit wherein representations of the multiples are stored, means for transmitting the representations of a multiplier to the precessing unit, a selector circuit for selecting the channel of the multiples storage unit appropriate to the value of a multiplier digit on each of a plurality of successive cycles, means for applying representations of the multiples in selected channels to the adder-subtracter on successive cycles for addition to one another to form a product, means for shifting representations of the first multiple so applied and the sums of it and other multiples one digit time per cycle to align the same for appropriate addition to the next multiple whose representation is transmitted to the adder-subtracter, and means for transmitting the representation of the product formed in the adder-subtracter to the number source.

25. In a cyclically operable computer wherein numbers are represented by electric signals, the combination of an adder wherein the nine multiples of a multiplicand are formed by adding the same to itself and its sums on nine successive cycles, means for so operating the adder, a multichannel storage unit wherein representations of the multiples are stored, a selector circuit for selecting the channel of the multiples storage unit appropriate to the value of a multiplier digit on each of a plurality of successive cycles, means for controlling said selector circuit in accordance with the values of the several digits of a multiplier, means for applying the representations of the multiples in selected channels to the adder on successive cycles for addition to one another to form a product, and means for shifting the representations of the first multiple so applied and the sums of it and other multiples one digit time per cycle to align the same for appropriate addition to the next multiple to be transmitted to the adder.

26. In a cyclically operable electronic computer wherein numbers are represented by electric signals, the combination of a multi-channel general storage medium, an adder, means for extracting a representation of a multiplicand from the general storage medium and applying it to the adder on each of nine successive cycles, a multichannel storage medium wherein representations of the multiples of the multiplicand are stored, means for applying outputs of the adder on each of said nine cycles to a different channel of the multiples storage medium, means for applying the output of the adder to an input thereof on each of the last eight of said nine cycles for addition of such outputs to the multiplicand which is transmitted from general storage, means for extracting a representation of a multiplier from general storage, a precessing unit wherein the multiplier representation is stored, one digit representation thereof being presented for use on each of a plurality of successive cycles, means for applying the multiples representations to the adder selectively on each of a plurality of successive cycles including a selection circuit for connecting the multiples storage channel in which the selected multiplier is stored, to the adder, means controlled by the multiplier digit representation presented for use on each cycle for controlling said selection circuit in accordance with the value of said digit, and means for applying the outputs of the adder to an input thereof to effect addition of the multiples transmitted thereto, said means effecting a one digit time misalignment between each reapplied output and the representation of the multiple to be added thereto.

27. The combination according to claim 26 wherein the means for applying the output of the adder to an input thereof to effect formation of the multiples includes a delay loop having an effective delay of one cycle and wherein the means for applying the output of the adder to an input thereof to effect addition of the multiples includes a delay loop having an effective delay different from that of the first loop by one digit time.

28. The combination according to claim 27 wherein the number-representing signals comprise a series of pulses to indicate binary one and binary zero and wherein the means for operating the selection circuit comprises a plurality of flip-flops, coincidence gate pullers for said flip-flops to set the same to a predetermined state, timed means for successively conditioning said pullers for selective operation by the pulses representing the multiplier digit presented for use on each cycle, and pullers for setting the flip-flops to the opposite state preparatory to each such conditioning thereof.

29. The combination according to claim 27 wherein the multiplier digit presented for use on each cycle is in the form of a plurality of successive pulses to indicate binary one and binary zero, and wherein the means for operating the selection circuit comprises a plurality of flip-flops, one for each pulse of the succession, coincidence gate pullers for said flip-flops to set the same to a predetermined state, timed means for successively conditioning said pullers to respond each to the related multiplier signal, and pullers for setting the flip-flops to the opposite state preparatory to each such conditioning thereof.

30. In a cyclically operable electronic computer wherein numbers are represented by electric signals and including a multi-channel storage device in which representations of the nine multiples of a multiplicand are stored, one multiple per channel, the combination of an adder, means for extracting multiples representations from storage and applying them to the adder, one multiple per cycle, a selection circuit operable to select which multiple is to be extracted upon each cycle, a precessing storage device for the representation of a multiplier and operable to present a representation of one digit of the multiplier for use on each of a plurality of successive cycles, means for operating said selection circuit in accordance with the value of each multiplier digit presented for use, and means operable to reapply to the adder on each cycle save the first on which a multiple representation is transmitted thereto, the representation of the first applied multiple or of the sum of two or more multiples, said means reapplying the same in time with the application to the adder of a multiple representation from multiple storage, but shifted one digit time.

31. The combination according to claim 30 wherein the means for applying the output of the adder to an input thereof to effect formation of the multiples includes a delay loop having an effective delay of one cycle and wherein the means for applying the output of the adder to an input thereof to effect addition of the multiples includes a delay loop having an effective delay different from that of the first loop by one digit time.

32. The combination according to claim 31 wherein the number representing signals comprise a series of pulses to indicate binary one and binary zero and wherein the means for operating the selection circuit comprises a plurality of flip-flops, coincidence gate pullers for said flip-flops to set the same to a predetermined state, timed means for successively conditioning said pullers for selective operation by the pulses representing the multiplier digit presented for use on each cycle, and pullers for setting the flip-flops to the opposite state preparatory to each such conditioning thereof.

33. The combination according to claim 31 wherein the multiplier digit presented for use on each cycle is in the form of a plurality of successive pulses to indicate binary one and binary zero, and wherein the means for operating the selection circuit comprises a plurality of flip-flops, one for each such pulse, coincidence gate pullers for said flip-flops to set the same to a predetermined state, timed means for successively conditioning said pullers to respond each to the related multiplier signal, and pullers for setting the flip-flops to the opposite state preparatory to each such conditioning thereof.

34. In a circuit for comparing a plurality of first numbers with a second number to determine which of the first numbers are smaller than the second, and wherein the numbers are represented by trains of pulses of two kinds to represent binary one and binary zero, the combination of a plurality of flip-flops, one for each first number, a means for setting each flip-flop to a predetermined state preparatory to each comparison, a first coincidence means for each flip-flop to set the same to the opposite state, a second coincidence means for each flip-flop to set the same to said predetermined state, the pulse trains for a first and the second numbers being applied directly to each first and second coincidence means respectively, and means for applying the pulse trains for the second and a first number in inverted form to each first and second coincidence means respectively.

35. The combination according to claim 34 wherein said first numbers are progressively larger and the flip-flops are assigned each to an order of the progression, and including means for indicating which of the first numbers is the largest one smaller than or equal to the second number.

36. The combination according to claim 34 wherein said first numbers are progressively larger and the flip-flops are assigned each to an order of the progression, and including means for indicating which of the first numbers is the largest one smaller than or equal to the second number, in a parallel, predetermined code, said means including a plurality of signal lines, one for each point of the code, a series of gates differentially controlled by said flip-flops to apply signal potentials selectively to all but one of the lines in accordance with the settings of the flip-flops, said one line having the signal potential applied thereto by a said flip-flop when the latter is in said opposite state, a storage flip-flop associated with each said line and set to a predetermined state when a signal potential is applied to the latter, and means for setting each storage flip-flop to the opposite state preparatory to each setting thereof by the said lines.

References Cited in the file of this patent

UNITED STATES PATENTS

| | | |
|---|---|---|
| 2,304,495 | Cunningham | Dec. 8, 1942 |
| 2,307,116 | Dickinson | Jan. 5, 1943 |
| 2,328,610 | Bryce | Sept. 7, 1943 |
| 2,344,885 | Kozma | Mar. 21, 1944 |
| 2,590,950 | Eckert | Apr. 1, 1952 |
| 2,609,143 | Stibitz | Sept. 2, 1952 |
| 2,611,813 | Sharpless | Sept. 23, 1952 |
| 2,623,115 | Woods-Hill | Dec. 23, 1952 |
| 2,701,095 | Stibitz | Feb. 1, 1955 |
| 2,712,898 | Knutsen | July 12, 1955 |

OTHER REFERENCES

A Functional Description of the EDVAC, Moore School of Engineering, Univ. of Pennsylvania, Nov. 1, 1949, received in Patent Office library May 3, 1951, vol. I pages 4–18 to 4–24, vol. II 104–3LD–2.

Investigations for Design of Digital Calculating Machinery Progress Report No. 2, Computation Lab., Harvard Univ., Nov. 19, 1948, pages II–5 through II–9.

Proc. of Inst. of Elec. Engrs., April 1952, "Universal High Speed Digital Computers, Serial Computing Circuits," by Williams et al., pages 107 to 123.

"Theory and Technique for Design of Elec. Digital Computers," Moore School of Elec. Engr., Univ. of Pa., July 15, 1948, pages 47–9 to 47–12, and drawing 47–14.

Proc. IRE, January 1952 (excerpt from the Binac, Auerbach et al., pp. 19 and 20).

UNITED STATES PATENT OFFICE

CERTIFICATE OF CORRECTION

Patent No. 2,834,543 May 13, 1958

William H. Burkhart

It is hereby certified that error appears in the printed specification of the above numbered patent requiring correction and that the said Letters Patent should read as corrected below.

Column 27, line 63, for "of", first occurrence, read -- to --; column 28, line 75, for "of", first occurrence, read -- for --.

Signed and sealed this 15th day of July 1958.

(SEAL)

Attest:

KARL H. AXLINE

Attesting Officer

ROBERT C. WATSON

Commissioner of Patents